US011757278B1

(12) United States Patent
Sun et al.

(10) Patent No.: US 11,757,278 B1
(45) Date of Patent: Sep. 12, 2023

(54) METHOD AND SYSTEM FOR FAULT LOCATION AND PROTECTION OF INVERTER-DOMINATED ISLANDED UNGROUNDED MICROGRIDS

(71) Applicant: Mitsubishi Electric Research Laboratories, Inc., Cambridge, MA (US)

(72) Inventors: Hongbo Sun, Cambridge, MA (US); Fangyuan Chang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 15 days.

(21) Appl. No.: 17/654,176

(22) Filed: Mar. 9, 2022

(51) Int. Cl.
*H02H 3/26* (2006.01)
*H02H 1/00* (2006.01)

(52) U.S. Cl.
CPC .......... *H02H 3/265* (2013.01); *H02H 1/0092* (2013.01)

(58) Field of Classification Search
CPC .......... H02H 3/265; H02H 3/28; H02H 3/283; H02H 3/32; H02H 3/26; H02H 1/0092; H02H 1/04; H02H 1/046
See application file for complete search history.

(56) References Cited

U.S. PATENT DOCUMENTS

| 2011/0216453 A1* | 9/2011 | Haines | H02H 9/00 |
| | | | 361/49 |
| 2013/0200713 A1* | 8/2013 | Ikawa | G01R 31/52 |
| | | | 361/18 |

(Continued)

FOREIGN PATENT DOCUMENTS

EP 3605776 7/2018

OTHER PUBLICATIONS

Liang et al. "The fault detection method of islanded microgrid with the CV/f controlled distributed generation." Electrical Power and Energy Systems 112 (2019) pp. 28-35.

*Primary Examiner* — Nguyen Tran
(74) *Attorney, Agent, or Firm* — Gennadiy Vinokur; Hironori Tsukamoto

(57) ABSTRACT

Disclosed a method and system for fault location and protection of Microgrids which are operated under islanded mode by being disconnected from distribution systems under large disturbance or disaster scenarios. The disclosed method is invented to meet the protection needs for disconnected ungrounded microgrids without appropriate protection systems that are usually installed only at distribution substations. Moreover, the disclosed protection method or scheme is targeted at inverter-dominated microgrids in which fault current limiters are installed to protect inverters introduced by the increasing penetration of inverter-based distributed generators (IBDGs). Based on transient analysis and dynamic simulation of islanded ungrounded microgrids during different types of faults, it is realized that of the first terminal and second terminal sensors of the branch different types of faults can be effectively detected based on sequent components of currents flowed through terminals at faulted branches or sections, even with multiple IBGDs deployed in the Microgrids under different control strategies. The phase angle differences of zero sequence currents, and magnitude differences of negative sequence currents, and sign changes of phase currents are used to locate and protect against unsymmetrical and symmetrical faults within the islanded microgrids with lower fault currents, respectively.

22 Claims, 20 Drawing Sheets

(56) References Cited

U.S. PATENT DOCUMENTS

2015/0380923 A1* 12/2015 Ukil .................. H02H 3/083
361/93.1
2020/0350761 A1  11/2020  Wang et al.

* cited by examiner

METHOD AND SYSTEM FOR FAULT LOCATION AND PROTECTION OF INVERTER-DOMINATED ISLANDED UNGROUNDED MICROGRIDS

TECHNICAL FIELD

The present disclosure relates generally to electric power systems, and more particularly to microgrid fault location and protection.

BACKGROUND

Microgrids have been attracting much more attention recently with the development of a renewable-energy-aware society. Microgrids are localized power grids that can disconnect from the traditional power grid to operate autonomously and are thereby able to strengthen grid reliability and mitigate grid disturbance. Additionally, they are considered promising solutions for operating future power systems integrated with distributed generators (DGs) and renewable energy sources (RESs).

The operation of microgrids is very flexible in that they can operate in both grid-connected and islanded modes. However, the characteristics of a microgrid, such as fault levels and control strategies of inverter-based distributed generators (IBDGs), could vary considerably for different operation modes. Therefore, traditional fault protection schemes may not be applicable to islanded microgrids. Specifically, fault levels are significantly different in each mode. The fault currents of larger magnitudes (10-50 times the full-load current) are available to activate the traditional overcurrent protection device in grid-connected mode; however, fault currents of only about 5 times the full-load current are available in an islanded microgrid. Especially in an islanded microgrid with high penetration of inverter-based distributed generators (IBDGs), the maximum output fault current is generally limited to 1.2-2 times that of the rated current. Nevertheless, traditional overcurrent protection devices are usually set to operate at 2-10 times the full-load current, which cannot detect and protect islanded microgrids.

Moreover, the control techniques of IBDGs are also different in each mode. The common control strategies for IBDGs include active and reactive power (PQ) control (grid feeding) and voltage and frequency (VF) control (grid following). PQ control can supply constant power with a reference of active power and reactive power. VF control can regulate the voltage and frequency of IBDG through a voltage control loop and current control loop. All the IBDGs in a microgrid can be operated under PQ control in grid-connected mode, while an IBDG under VF control is required to support the grid voltage in islanding mode. The control strategies of IBDGs could also have a significant impact on fault behaviors. Both of the aforementioned factors lead to new technical challenges to fault location and protection, especially in islanded microgrids.

There are some related works existing in Microgrid fault detection, location and protection. An example for this research can be found in a European patent application EP3605776. This application presents a method for locating phase faults in a microgrid in off-grid mode. The method includes obtaining a grid topology of the microgrid having at least two busbars and determining the position of all circuit breaker position of the grid topology. Further, acquiring measurement data which includes current magnitude and voltage magnitude. Monitoring the at least two busbars for a voltage dip in one of phase-to-phase or phase-to-neutral voltages. On detecting a voltage dip, determining a defect phase having a minimum phase-to-neutral voltage value. And for the defect phase performing busbar analysis and feeder analysis, using phase-directional information.

Another example is a US patent application, US 2020/0350761 A1. It discloses a method for protecting and controlling a microgrid with a dynamic boundary. It includes detecting a fault in a microgrid that includes a dynamic point-of-common-coupling (PCC), in response to determining that the microgrid is operating in a grid-connected mode, isolating the fault by tripping a microgrid side smart switch and a grid side smart switch that are located immediately adjacent to the fault, initiating the reclosing of the grid side smart switch, and initiating the reclosing for the microgrid side smart switch via resynchronization if the grid side smart switch is successfully reclosed, and in response to determining that the microgrid is operating in an islanded mode, isolating the fault by tripping a microgrid side smart switch that is located immediately adjacent to the fault, and initiating the reclosing of the microgrid side smart switch.

However, both the first and second patent disclosures did not consider the characteristics of inverter dominated Microgrids and the impacts of IBDGs.

Yet example for Microgrid fault detection is a paper titled "The fault detection method of islanded microgrid with the v/f controlled distributed generation" and authored by Z. Liang and others (published in International Journal of Electrical Power & Energy Systems, 112, pp. 28-35, 2019). It disclosed a fault detection method for the islanded microgrid, which leverages the phase differences between the pre-fault bus voltage and the positive-sequence current fault component of the feeders. However, the differences among the major types of faults are ignored.

Therefore, there is a need for an effective fault location and protection method for islanded inverter-dominated microgrids.

SUMMARY

The present disclosure provides a fault location and protection method or scheme for islanded ungrounded microgrids with dominated inverter based distributed generators (IGDBs) equipped with fault current limiters (FCLs). Microgrids are attracting increasing interest since they are allowed to work under islanded mode by being disconnected from large-scale commercial distribution networks when large disasters occur. However, disconnected microgrids do not contain appropriate protection systems, which in most cases are installed only at distribution substations. Moreover, the fault currents are significantly limited due to the high penetration of IGDBs.

The disclosed method is developed based on a transient analysis of islanded ungrounded microgrids, in which multiple IBGDs are deployed under different control strategies, during different types of faults. Furthermore, the fault detection and location method is proposed based on two-terminal measurements instead of the single-terminal measurements often utilized in conventional protection schemes such as overcurrent protection. The proposed method does not rely on heavy information exchange. It locates different types of faults in islanded microgrids through monitoring zero-sequence components, negative-sequence components, and phase currents collected from line segments of the microgrid. A simulation result on a sample system is given to show that the proposed method works well in islanded microgrids with lower fault current levels.

Some embodiments of the present invention provide a computer-implemented method for protecting a power grid system including a primary bus and an islanded microgrid disconnected from a distribution system, the islanded microgrid forming branches from the primary bus, the islanding microgrid including at least one distributed generator (DG), each DG including at least one switchable device to separate its power supply from the power grid, each of the branches including a first terminal sensor arranged at a near side of the primary bus and a second terminal sensor arranged at opposite terminal bus of the branch, the primary and terminal sensors indicating a branch location of each of the branches in the power grid. In this case, the method uses a processor coupled with a memory stored instructions implementing the method, wherein the instructions, when executed by the processor carry out at steps of the method, include receiving, from each of the branches, measurement data including the branch location from the first terminal sensor and the second terminal sensor, wherein the measurement data include zero-sequence currents of the first terminal sensor and the second terminal sensor, negative-sequence currents of the first terminal sensor and the second terminal sensor, and phase currents of the first terminal sensor and the second terminal sensor; determining a branch indicating a fault status among the branches if there is approximately a 180-degree phase angle difference between the zero-sequence currents, if a difference amount between the negative-sequence currents of the first terminal and second terminal sensors at the branch is equal to or greater than a threshold, or if a difference of signs of any phase currents as a function of time indicates transitions between zero and two; and transmitting a control command to switching devices that can isolate the determined branch indicating the fault status from power supply of DGs based on the distances from the switch locations to the determined branch wherein the control command instructs the switching devices to disconnect the determined branch indicating the fault status.

Further, according to some embodiments of the present invention, a fault location and protection system is provided for protecting a power grid system including a primary bus and an islanded microgrid disconnected from a distribution system. In this case, the islanded microgrid forms branches from the primary bus, the islanded microgrid including at least one distributed generator (DG), each the at least one DG including at least one switchable device to separate power supply of the at least one DG from the power grid, each of the branches including a first terminal sensor arranged at a near side of the primary bus and a second terminal sensor arranged at opposite terminal bus of the branch, the first and second sensors indicating a branch location of each of the branches in the power grid, wherein the method uses a processor coupled with a memory stored instructions implementing the method, wherein the instructions, when executed by the processor carry out at steps of the method, comprising: an interface configured to receive, from each of the branches, measurement data including the branch location from the first terminal sensor and the second terminal sensor, wherein the measurement data include zero-sequence currents of the first terminal sensor and the second terminal sensor, negative-sequence currents of the first terminal sensor and the second terminal sensor, and phase currents of the first terminal sensor and the second terminal sensor; a processor configured to perform a computer-implemented method; a memory configured to store the computer-implemented method, wherein the method uses the processor coupled with the memory stored instructions implementing the method, wherein the instructions, when executed by the processor carry out at steps of the method, comprises: determining a branch indicating a fault status among the branches if there is approximately a 180-degree phase angle difference between the zero-sequence currents, if a difference amount between the negative-sequence currents of the first and second terminal sensors at the branch is equal to or greater than a threshold, or if a difference of signs of any phase currents as a function of time indicates transitions between zero and two; and transmitting a control command to the at least one switchable device that is configured to isolate the determined branch indicating the fault status from the at least one DG, wherein the at least one switchable device is determined based on a distance from the at least one switchable device to the determined branch, wherein the control command instructs the switchable device to disconnect the determined branch from the at least one DG.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

Overview

The present disclosure relates generally to electric power systems, and more particularly to microgrid fault location and protection.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Many distribution networks are grounded at the distribution substations, and protection relays are often installed at the distribution substations and the customer sides. A part of the distribution network starts islanding its operation when or after an outage occurs, which requires an extra protection scheme. In this disclosure, we first develop a transient analysis for islanding ungrounded microgrids during different types of faults, where multiple IBDGs are deployed under different control strategies and the effects of FCLs of the IBDGs are considered. Then a set of fault location and protection schemes or methods are proposed for islanded microgrids based on the measurements of zero-sequence components, negative-sequence components, and phase current. The effectiveness of the method is demonstrated through simulation study on a sample microgrid.

Figure 1A:
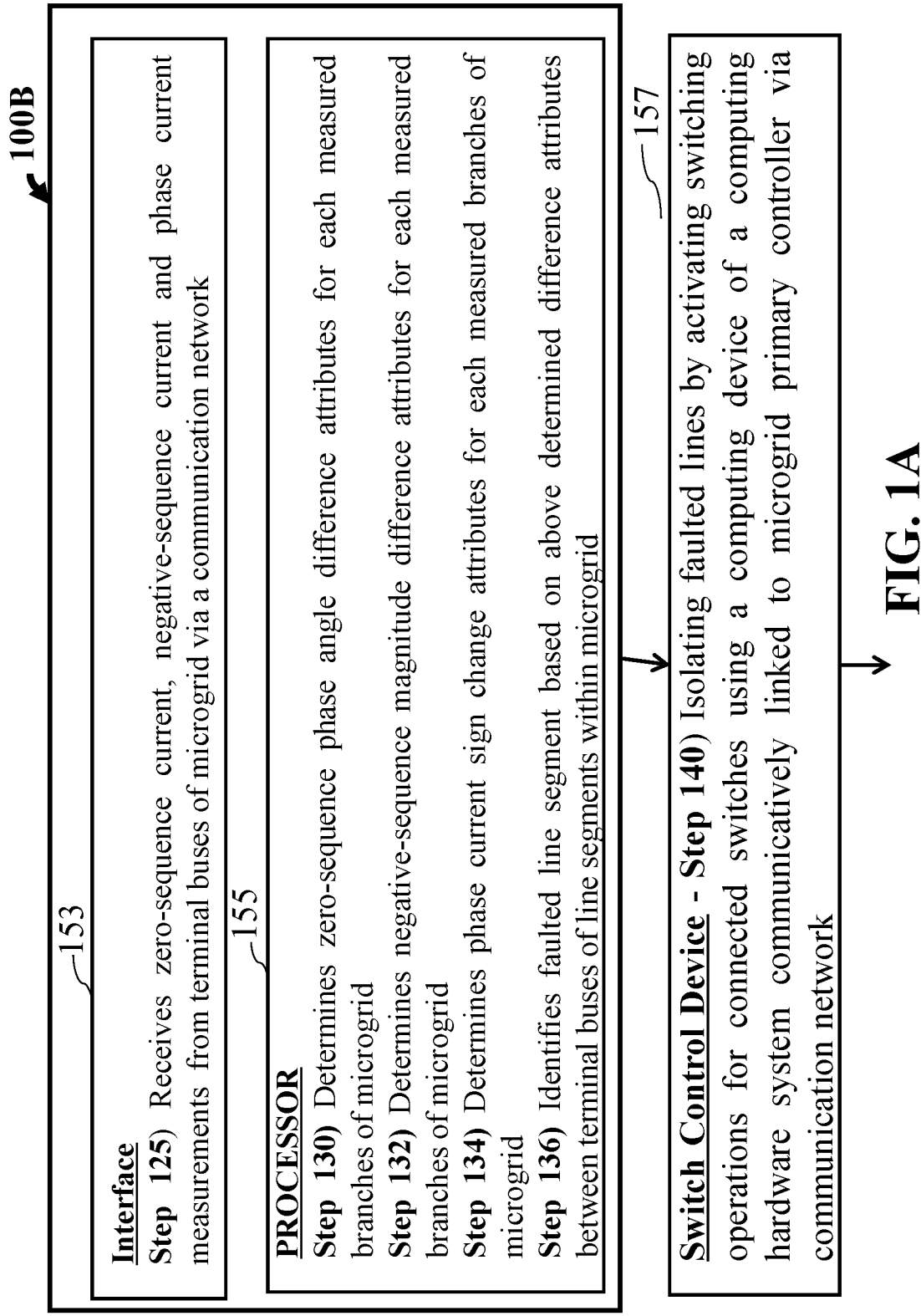
FIG. 1A is a block diagram illustrating a method for detecting and locating faults of an inverter-dominated ungrounded microgrid, according to embodiments of the present disclosure.

FIG. 1A is a block diagram illustrating a method for detecting and locating faults of an inverter-dominated ungrounded microgrid, according to embodiments of the present disclosure;

Step 125 includes method 100 using an interface 153 to receive zero-sequence current, negative-sequence current and phase current measurements from terminal buses of branches arranged in the microgrid via a communication network;

Step 130 includes method 100 using a hardware processor 155 to determine zero-sequence phase angle difference attributes for each measured branch of microgrid.

Still referring to step 132 of FIG. 1A, the hardware processor 155 to determine negative-sequence magnitude difference attributes for each measured branches of the microgrid.

Step 134 using the hardware processor 155 to determine phase current sign change attributes for each measured branch within the microgrid.

Step 136 using the hardware processor 155 to locate faulted line segment i.e. faulted branch based on above-determined difference attributes between terminal buses of each line segments within the microgrid.

Still referring to step 140 of FIG. 1A, includes method 100 to isolate faulted line segments by activating switching operations for connected switches using a computing device 157 via communication network.

Figure 1B:
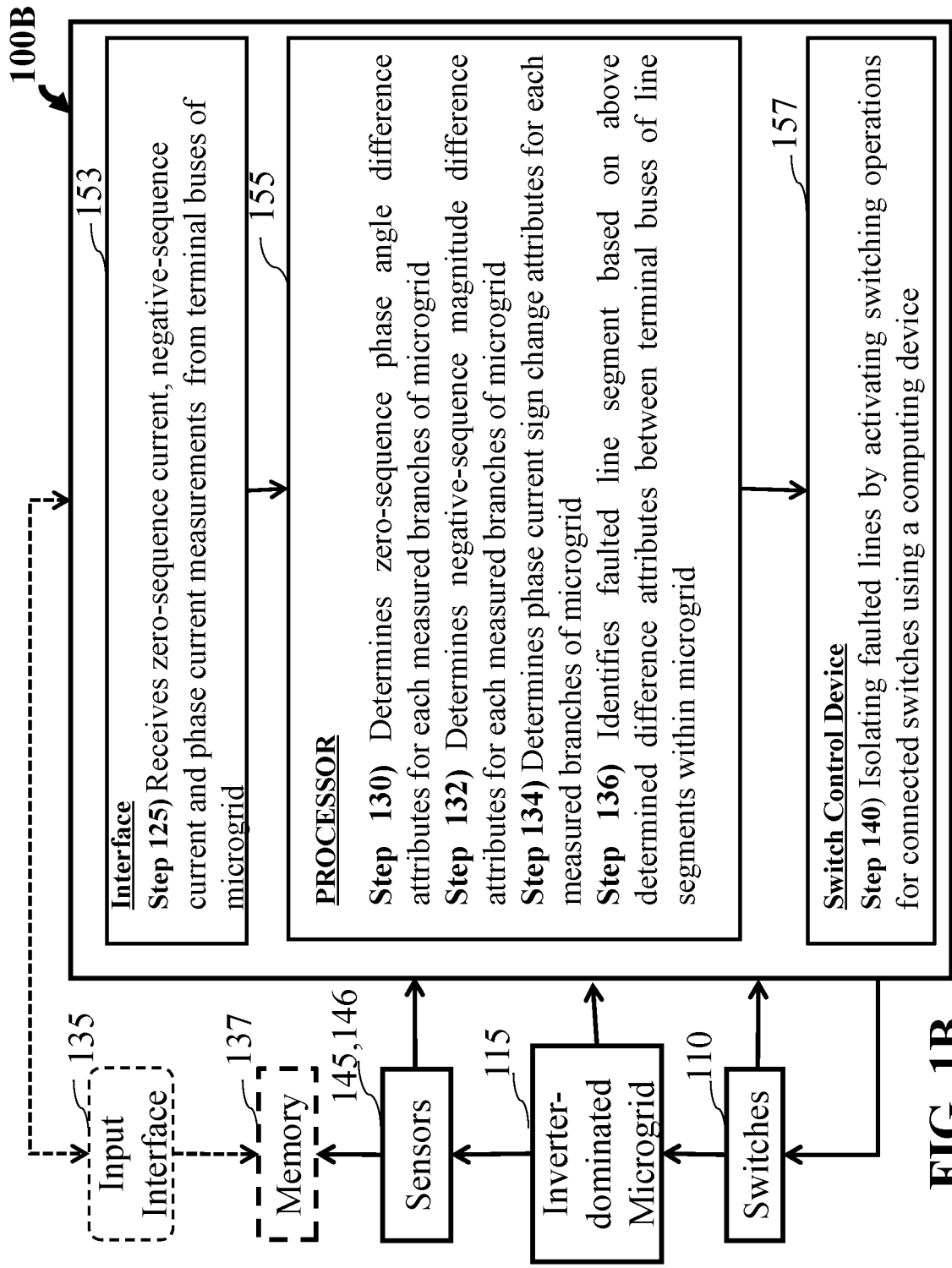
FIG. 1B is a schematic illustrating components and steps of detecting and locating faults of an inverter-dominated ungrounded microgrid, according to embodiments of the present disclosure.

FIG. 1B is a schematic illustrating components and steps of detecting and locating faults of an inverter-dominated ungrounded microgrid, according to embodiments of the present disclosure.

FIG. 1B can include a hardware processor 155 in communication with an input interface 135, a memory 137, an interface 153, a computing device 157. The computing device 157 can be connected to the set of switches 110 that installed in the microgrid 115. The microgrid can have a set of sensors including a first terminal sensor 145 and a second terminal sensor 146 to monitor and collect the condition information of the microgrid 115. The fault control system implemented with method 100 can control the set of switches 110 as well as can send and receive information. It is contemplated the hardware processor 155 can include two or more hardware processors depending upon the requirements of the specific application. Certainly, other components may be incorporated with method 100 including input interfaces, output interfaces and transceivers.

Still referring to FIG. 1B, aspects of the system 100 include step 125 of using an interface 153 to receive measurements of zero-sequence current, negative-sequence current and phase current from terminal buses of branches within the microgrid via a communication network.

Step 130 includes method 100 using a hardware processor 155 to determine zero-sequence phase angle difference attributes for each measured branch in the microgrid.

Step 132 includes determining negative-sequence magnitude difference attributes for each measured branch within the microgrid.

Step 134 includes determining phase current sign change attributes for each measured branch in the microgrid.

Step 136 includes locating the faulted line segment based on above determined difference attributes between terminal buses of line segments arranged in the microgrid.

Step 140 includes method 100 to isolate faulted line segments by activating switching operations for connected switches using a computing device 157 via communication network.

Figure 1C:
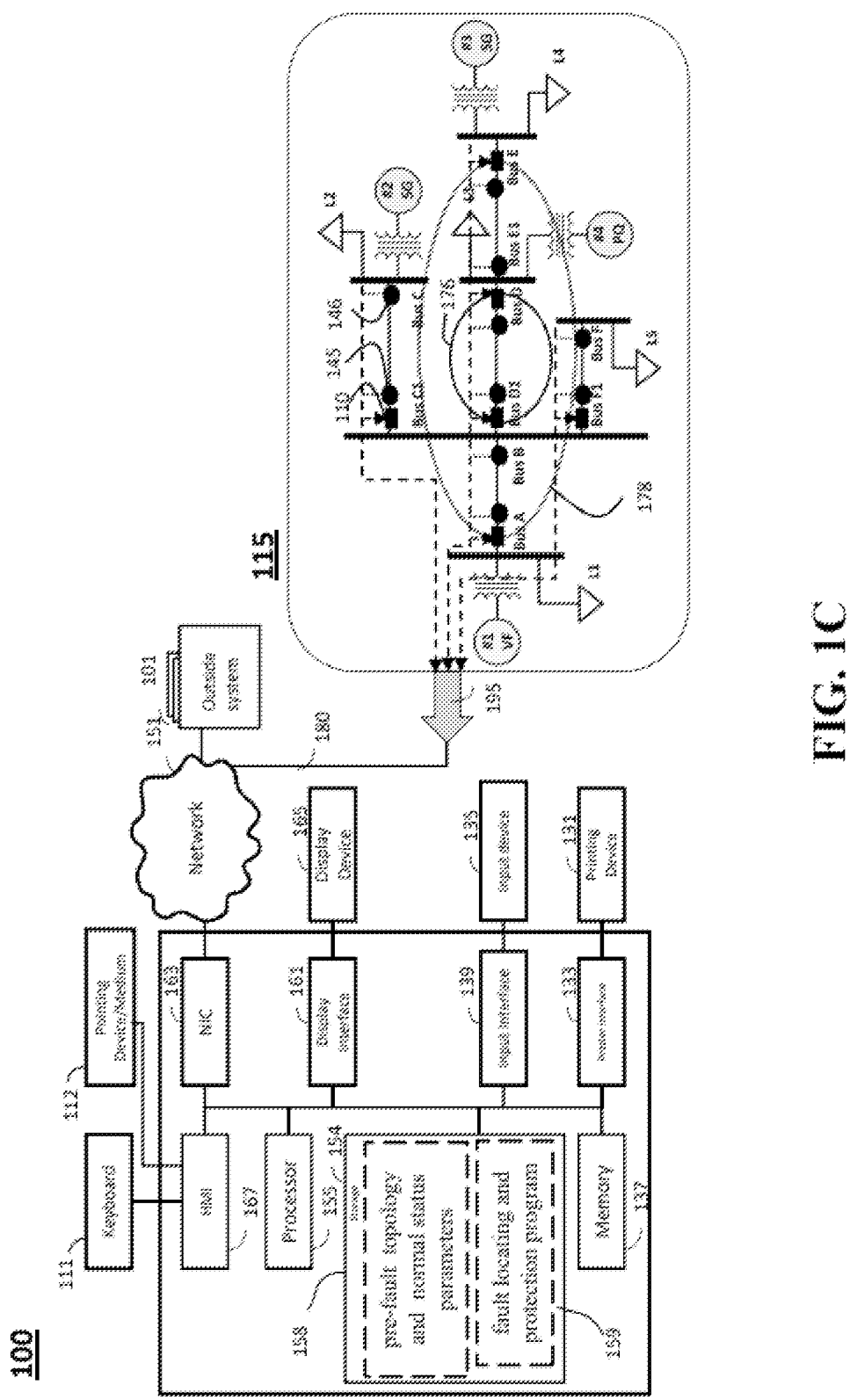
FIG. 1C is a block diagram illustrating a fault locating and protection system for detecting faults in an inverter-dominated ungrounded microgrid according to some embodiments of the invention.

FIG. 1C shows a block diagram of a fault location and protection system for identifying faults in an inverter-dominated ungrounded microgrid according to some embodiments of the invention.

The fault location and protection system 100 includes a human machine interface (HMI) 167 connectable with a keyboard 111 and a pointing device/medium 112, a processor 155, a storage device 154, a memory 137, a network interface controller 153 (NIC) connectable with a network 151 including local area networks and internet network, a display interface 161 connected to a display device 165, an input interface 139 connectable with an input device 135, a printer interface 133 connectable with a printing device 131.

The fault location and protection system 100 can receive electric signals 195 indicating currents or related sequence components of measurement devices arranged in an inverter-dominated ungrounded microgrid 115 via the network 151 connected to the NIC 153. The network 151 is connected to an outside system(s) 101 that can provide control signals to the measurement devices of the microgrid 115 for performing remote control of the measurement devices. Further, the fault location and protection system 100 can provide the outside system 101 fault locating status data (signals) via the network 151 so that the outside system 101 can control switching operation arranged in the microgrid 115. Further, the fault location and protection system 100 can be controlled from the outside system 101 by receiving control data (signals) of the fault location and protection system 100 via the network 151.

The storage device 154 includes pre-fault topology and normal status parameters 158 with respect to the microgrid 115 and a fault locating and protection program module 159. The input device/medium 135 may include modules that read programs stored on a computer readable recording medium (not shown).

For locating a fault or multiple faults in the microgrid 115, the fault location and protection system 100 may receive the status data of the microgrid 115 from the measurement devices included in the microgrid 115.

In accordance with some embodiments of the present invention, the microgrid 115 may include a set of terminal buses connected with branches, and a set of inverter-based, or synchronous generators. The fault location and protection system 100 uses the interface 153 to receive measured vectors indicating zero-sequence, negative-sequence and phase currents for each branch measured at its terminal buses via the network 151 (communication network). The memory 137 can load the computer-executable programs stored in the storage 154, in which the computer-executable programs include a pre-fault (normal status) topology 157 and a normal current vector (not shown) of the terminal buses and a fault location and protection program (module) 159 configured to locate the faults caused in the microgrid 115 and determine protection scheme for the faults in the microgrid 115. At least one processor 155 in connection with the memory 137 and the interface 153 are used to perform the fault location program 159 loaded from the storage 154. For instance, when performed by the processor 155, the fault location program 159 causes the processor 155 to receive zero-sequence components of currents from the measurements 195, and the processor 155 determines if an unsymmetrical fault is caused on any line segment in the microgrid 115 by comparing phase angle differences for all measured line segments. If a faulted line segment is identified such as on the branch between bus D1 and bus D, the fault location program 159 further requests the processor 155 to provide the normal connectivity topology from the storage 154, and then through connectivity tracing, the program 159 determines a main protection scheme by identifying the first-tier isolating switches 176 to isolate the determined faulted branches by disconnecting it from access to all power supplies, and also a backup protection scheme by identifying the second-tier isolating switches 178 to isolate the fault if the main protection scheme fails to function. Then the processor 155 outputs a post-fault topology indicating a location of the fault, and associated switch operations required by the determined primary and backup protection schemes. In this case, each of the line segments i.e. branches may include two current measurement units installed at its two terminal buses connected to the communication network. Further, the interface (NIC) 153 can receive the measured signals every preset period of time via the network 151 from the microgrid 115.

In some cases, the instructions to start/perform locating the faults may be transmitted to the fault location and protection system 100 using the keyboard 111 or from the outside system 101 via the network 151.

Modeling of Islanding Microgrids

Problem Description and Assumptions

Many electric distribution networks are usually grounded at the distribution substations. Protection relays such as overcurrent relays and over-voltage ground relays are installed at the distribution substations and the customer sides. A part of the distribution network starts islanding operation when or after an outage occurs. Therefore, an extra protection scheme is required for the islanded microgrids disconnected from the main grids when a disaster or blackout occurs. We assume that the islanded microgrids are equipped with both traditional synchronous generators (SGs) and inverter-based RESs, which is common in practice. One of the inverters of the RESs is VF-controlled and others are PQ-controlled when the microgrid is operated in islanded mode. All inverters are installed with their own fault current limiter (FCL).

Control Strategies of IBDGs

Figure 2:
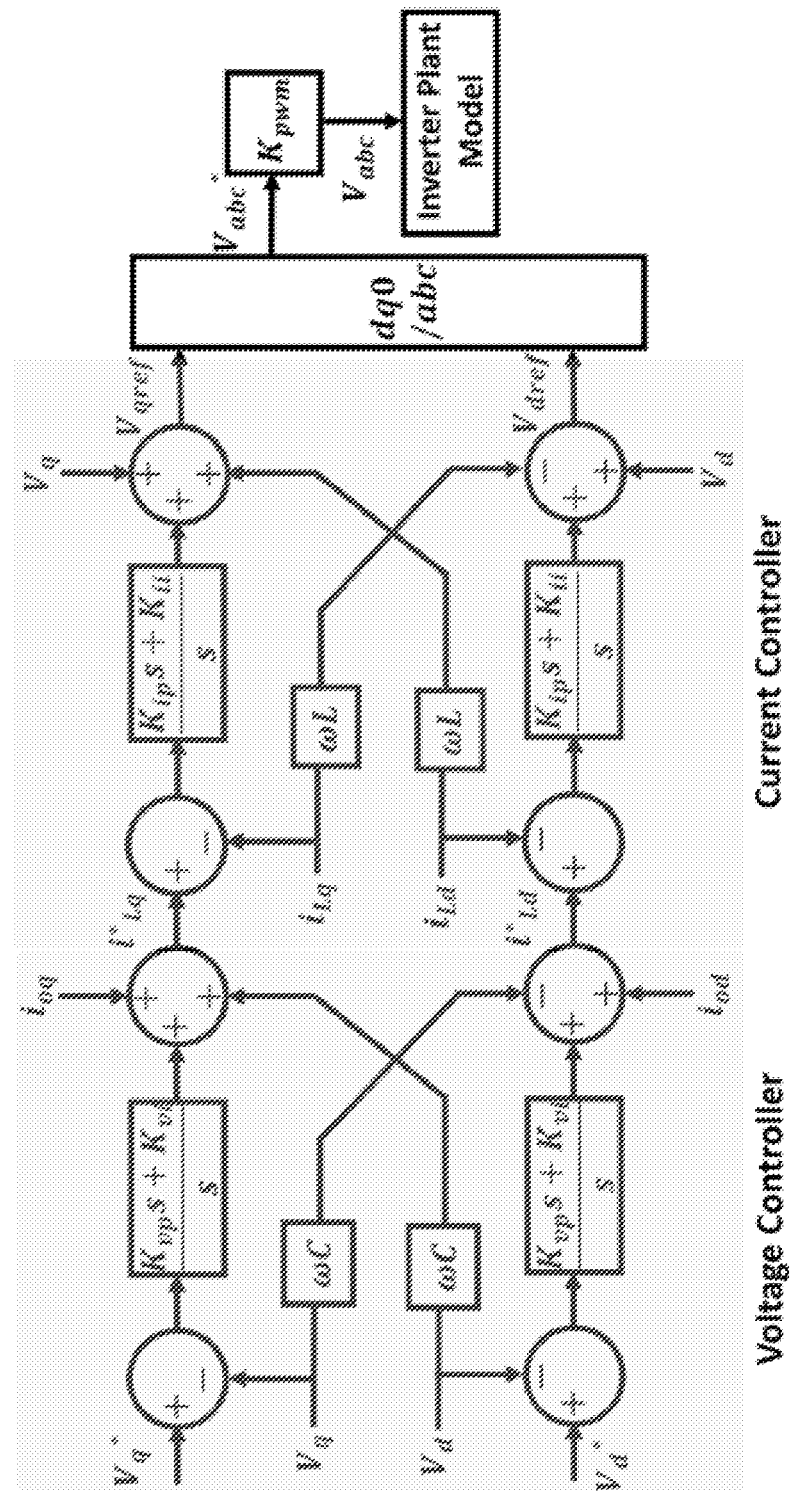
FIG. 2 is a schematic illustrating control block diagram for VF-controlled IBDGs, according to some embodiments of the present disclosure.
Figure 3:
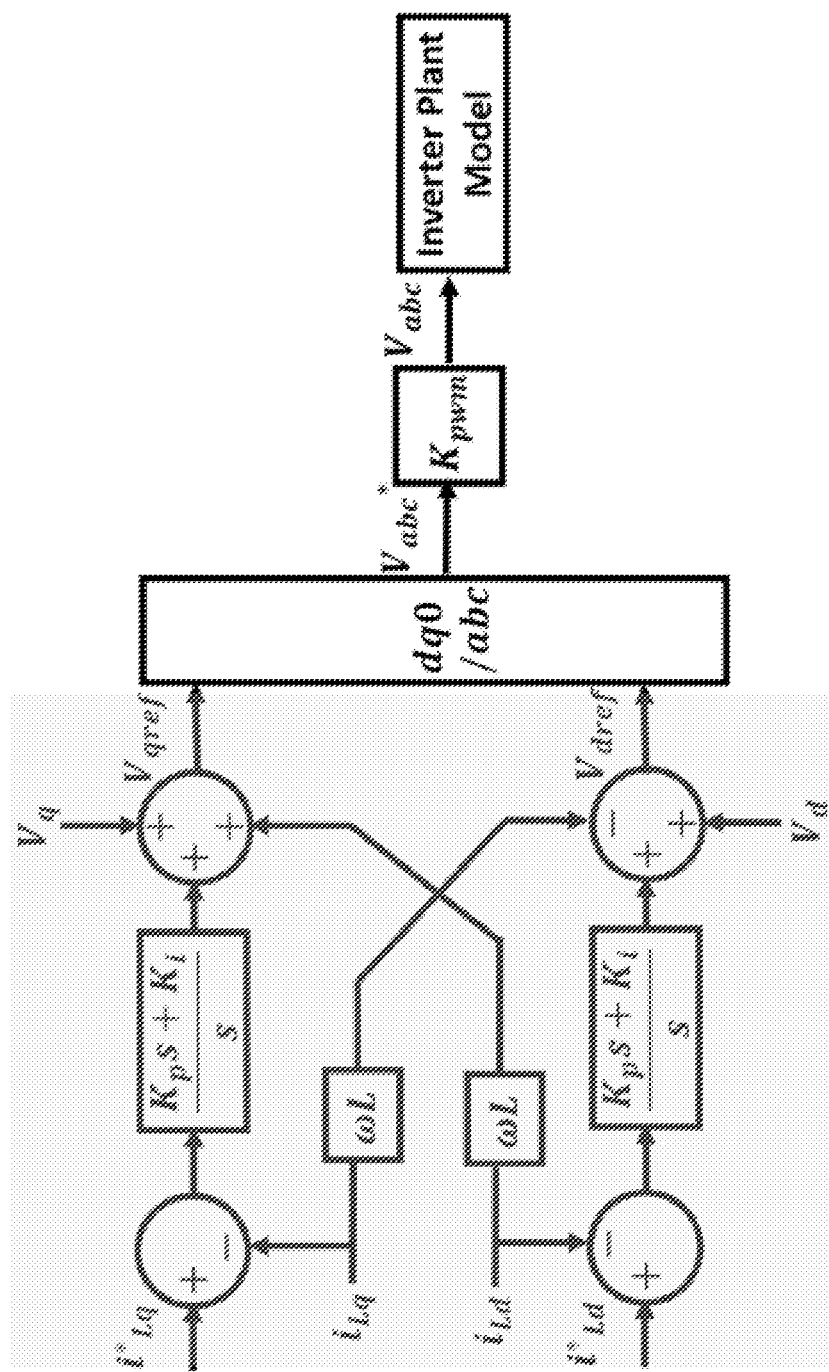
FIG. 3 is a schematic illustrating control block diagram of PQ-controlled IBDGs, according to some embodiments of the present disclosure.

VF control and PQ control are two major control strategies for IBDGs. A VF-controlled inverter is also known as a grid forming inverter, which is employed to support the autonomous operation of microgrids in islanding mode. An islanded microgrid needs to greatly meet all the load requirements while keeping voltage and frequency at referred values. VF control is usually utilized for controllable power such as fuel cells and micro-gas turbines. The control block diagram of VF-controlled IBDGs is described in FIG. 2. A PQ-controlled inverter, also known as a grid-following inverter, is usually used for intermittent power generation such as PV generation or wind turbines to follow power references. It can maximize the utilization of renewable energy with intermittency. The control block diagram is described in FIG. 3.

In grid-connected mode, all the IBDGs should be under PQ control since the frequency and voltage of the microgrid should follow the main grid. PQ-controlled inverters inject maximum power into the microgrid to achieve economic operation. The microgrid moves to islanded mode when it is disconnected from the main grid during a blackout. Then one of the IBDGs in the microgrid should begin to operate under VF control to support voltage and frequency.

Design of FCLs

A virtual-impedance-based FCL is deployed in each power inverter to suppress the damage of overcurrent based on the principle described by (1).

$$Z_{FCL} = \begin{cases} 0, & \text{if } I_d < I_{thd} \text{ and } I_q < I_{thq} \\ Z_o, & \text{otherwise} \end{cases} \quad (1)$$

Figure 4A:
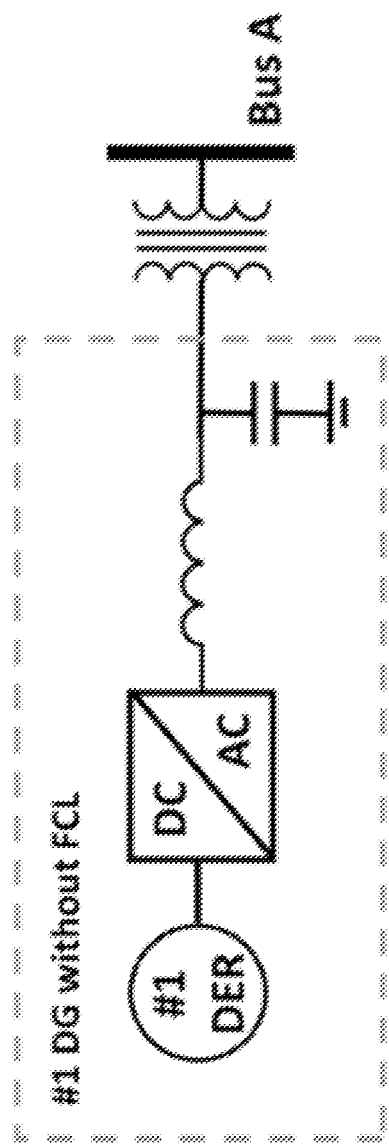
FIG. 4A is a schematic illustrating the configuration of an IBDG without FCL, according to some embodiments of the present disclosure.
Figure 4B:
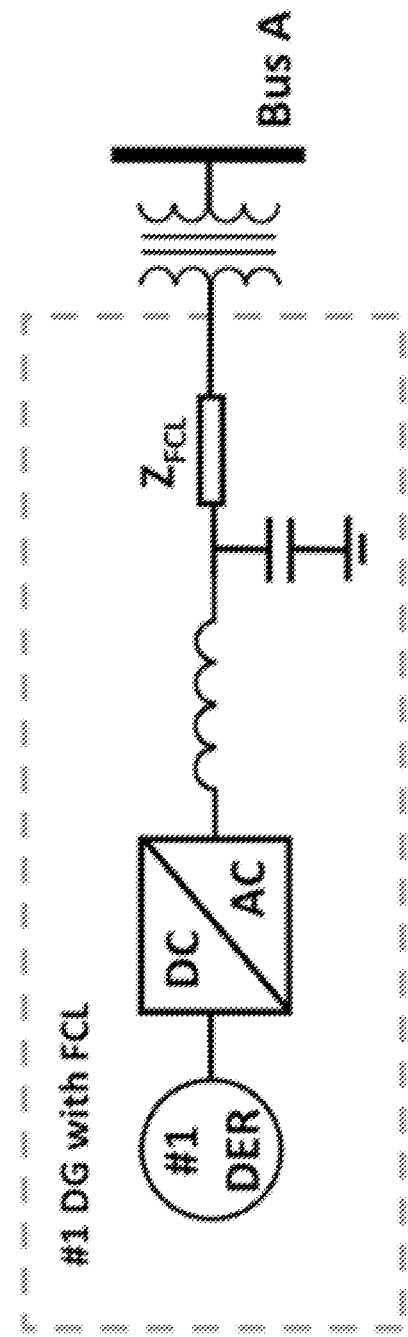
FIG. 4B is a schematic illustrating the configuration of an IBDG with FCL, according to some embodiments of the present disclosure.

According to (1), a nontrivial virtual-impedance $Z_o$ is activated when the d-axis current $I_d$ and q-axis current $I_q$ of the control current are over their corresponding thresholds $I_{thd}$ and $I_{thq}$. The configurations of an IBDG without FCL, and with FCL are shown in FIG. 4A and FIG. 4B, respectively.

Further, the d-axis current $I_d$ and q-axis current $I_q$ may be measured via the set of sensors 145 and 146. The set of the sensors 145 and 146 are connected to the fault location and protection system 100 via the network 151 using wired or wireless networks of the set of the sensors 145 and 146, such that the system 100 detects the d-axis current $I_d$ and q-axis current $I_q$. The system 100 is configured to activate/control the switchable device 110 to protect the power grid system when the d-axis current $I_d$ and q-axis current $I_q$ become greater than the thresholds $I_{thd}$ and $I_{thq}$.

Zero-Sequence and Negative-Sequence Equivalent Circuit

Figure 5A:
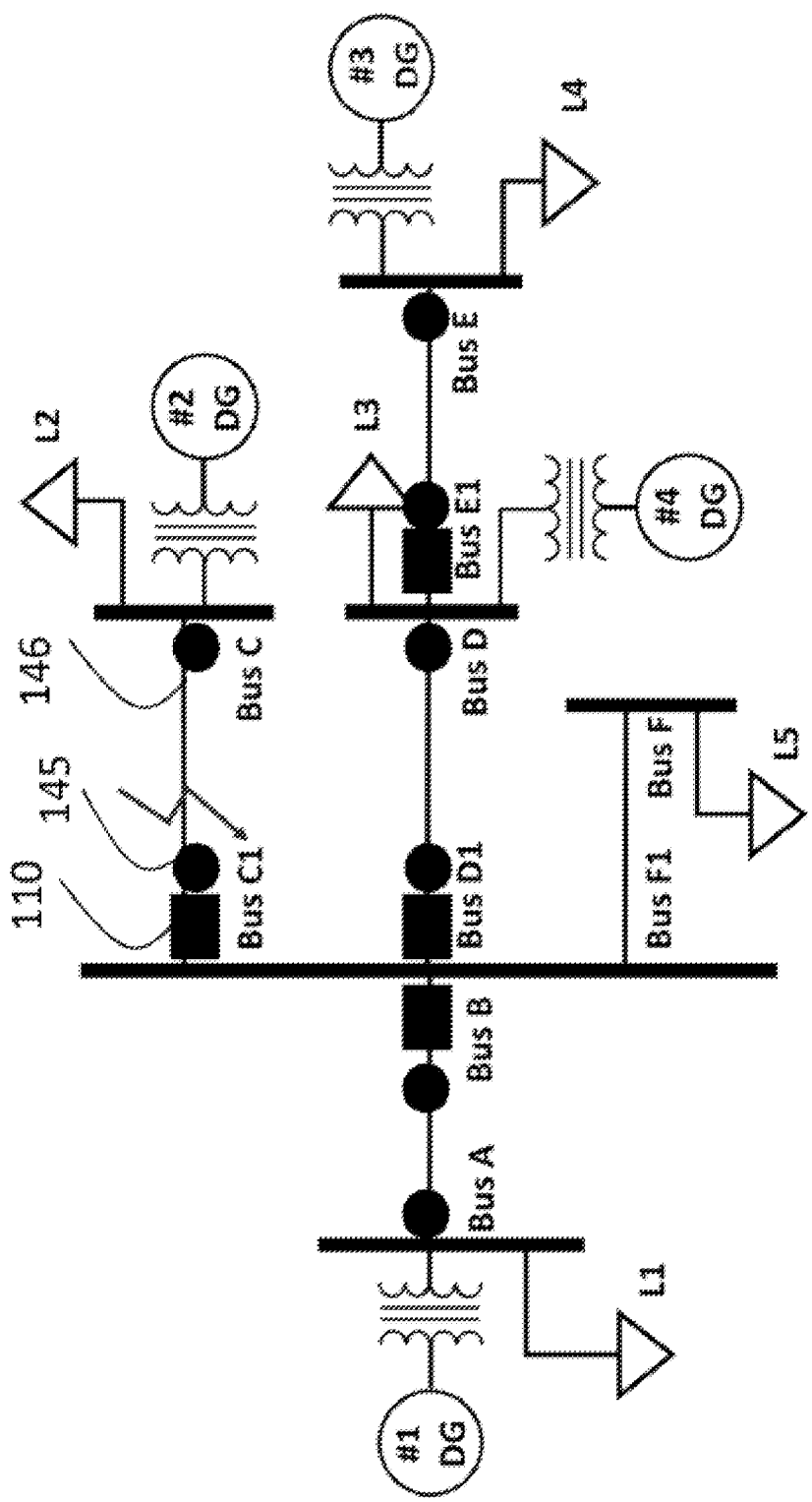
FIG. 5A is a schematic illustrating the original microgrid model, according to some embodiments of the present disclosure.
Figure 5B:
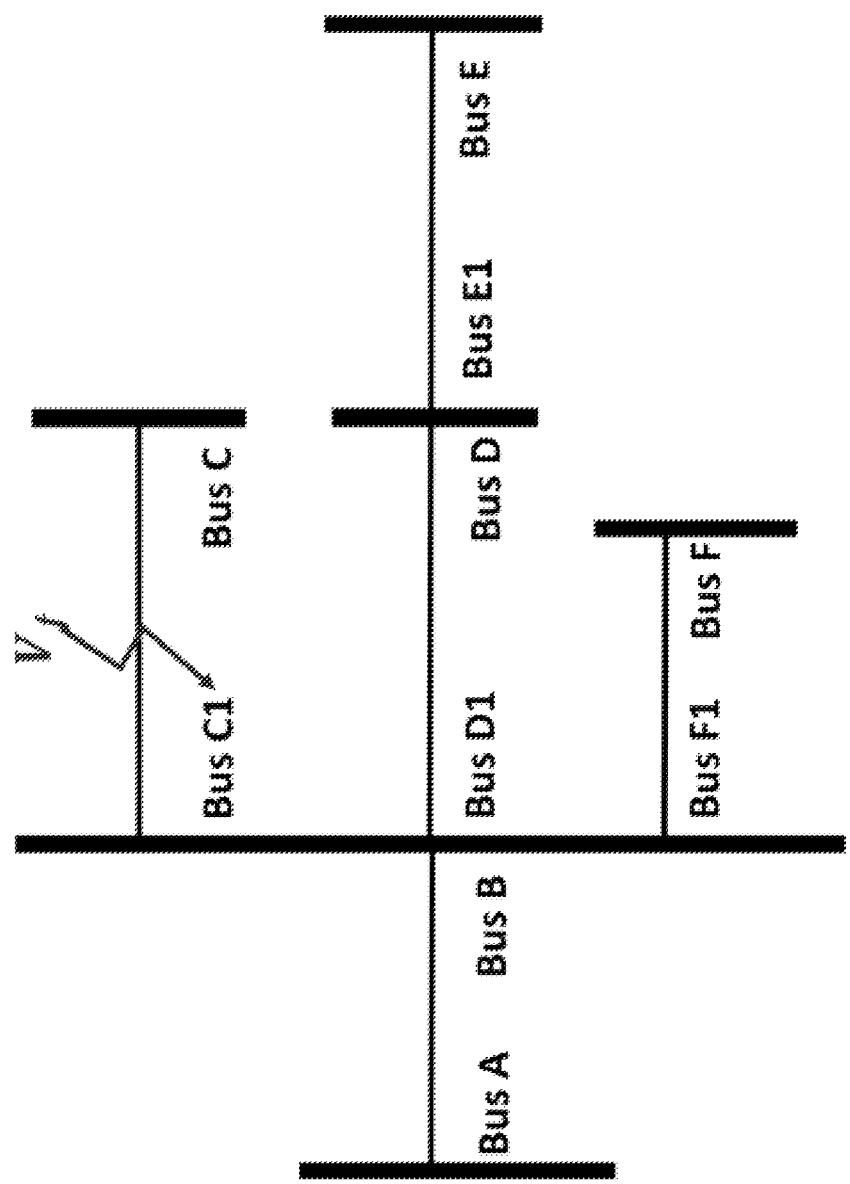
FIG. 5B is a schematic illustrating zero-sequence fault model, according to some embodiments of the present disclosure.

For many microgrids around the world such as Japanese Microgrids, generators and loads are usually ungrounded. A Delta-Y-connected transformer is often installed at the output of each generator. Considering that zero-sequence current cannot flow through a Delta-Y-connected transformer, the zero-sequence equivalent circuit of DGs is equal to an open circuit. An example is shown in FIG. 5A and FIG. 5B. FIG. 5A is a graph illustrating an islanded microgrid with multiple generators. FIG. 5B is a graph illustrating the zero-sequence circuit model for the original system of FIG. 5A. Suppose a fault voltage is imposed on branch C1C in FIG. 5A. From the zero-sequence fault model in FIG. 5B, we can expect that the zero-sequence fault currents flowing into different terminals could be from different directions via the first terminal sensor 145 and the second terminal sensor 146, which provides information for locating the fault. Accordingly, the information (measurement data or signals) with respect to the zero-sequence fault currents caused in the microgrid 115 is received by the fault location and protection system 100 via the interface 163 and the networks 151 configured to perform data communication with the sensor network of the first terminal sensor 145 and the second terminal sensor 146. When the fault location and protection system 100 determines the branch C1C indicating a fault status based on the information on the zero-sequence fault currents using a computer-implemented program (method) 159 for protecting a power grid system stored in the storage 154 coupled with the memory 137, the system 100 transmits a control command (signal) instructing the switching device 110 that isolates the fault lines connected to the branch C1C, such that the a power grid system is protected by isolating the fault branch C1C.

Figures 6A, 6B:
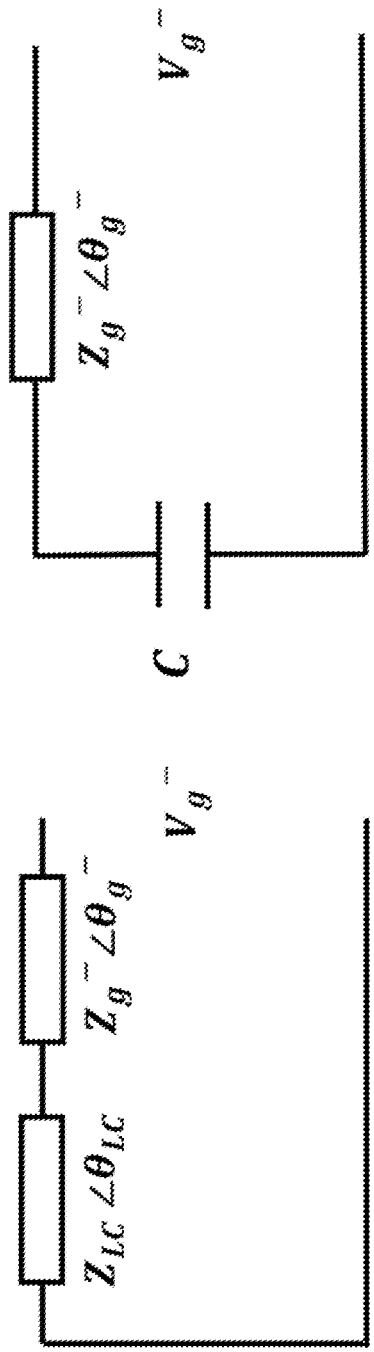
FIG. 6A is a schematic illustrating negative sequence equivalent model of VF-controlled IBDGs, according to some embodiments of the present disclosure.
FIG. 6B is a schematic illustrating negative sequence equivalent model of PQ-controlled IBDGS (right), according to some embodiments of the present disclosure.

Negative-sequence current can flow through a Delta-Y-connected transformer, which burdens the modeling of a negative-sequence equivalent circuit. The negative-sequence model of IBDGs is shown in FIG. 6. Of special note, the control block of VF-controlled IBDGs loses controllability of the negative-sequence circuit, and the negative-sequence impedance is defined by the filter rather than by the control block.

Fault Detection and Location Methods

The microgrid electromagnetic transient model is adopted to analyze at the microsecond level the transient process of a microgrid during a fault. With data collected by each sensor deployed at every terminal, we can obtain useful information on transient signals for fault detection and location. The common faults that happen in microgrids can be classified into unsymmetrical faults and symmetrical faults. The unsymmetrical faults include a single line-to-ground short circuit, line-to-line short circuit, and double line-to-ground short circuit; the symmetrical faults usually refer to a three-phase short circuit. We investigate the fault detection and location method for the two major types of faults separately in the following subsections.

The negative—(denoted by index 2), zero-sequence (index 0) along with the positive—(index 1) components, $I_2$, $I_0$ and $I_1$ of a set of three phase current signals can be computed as follows:

$$I_1 = \frac{I_a + aI_b + a^2 I_c}{3} \quad (2)$$

$$I_2 = \frac{I_a + a^2 I_b + aI_c}{3} \quad (3)$$

$$I_0 = \frac{I_a + I_b + I_c}{3} \quad (4)$$

where, $I_a$, $I_b$, and $I_c$ are three current phasors at power frequency, $a=e^{j2\pi/3}$ is a complex operator. A Fourier analysis over a sliding window of one cycle of the power frequency is first applied to the three input signals. It evaluates the phasor values $I_a$, $I_b$, and $I_c$ at the fundamental frequency. Then the transformation is applied to obtain the positive sequence, negative sequence, and zero sequence.

Unsymmetrical Faults

Figure 7:
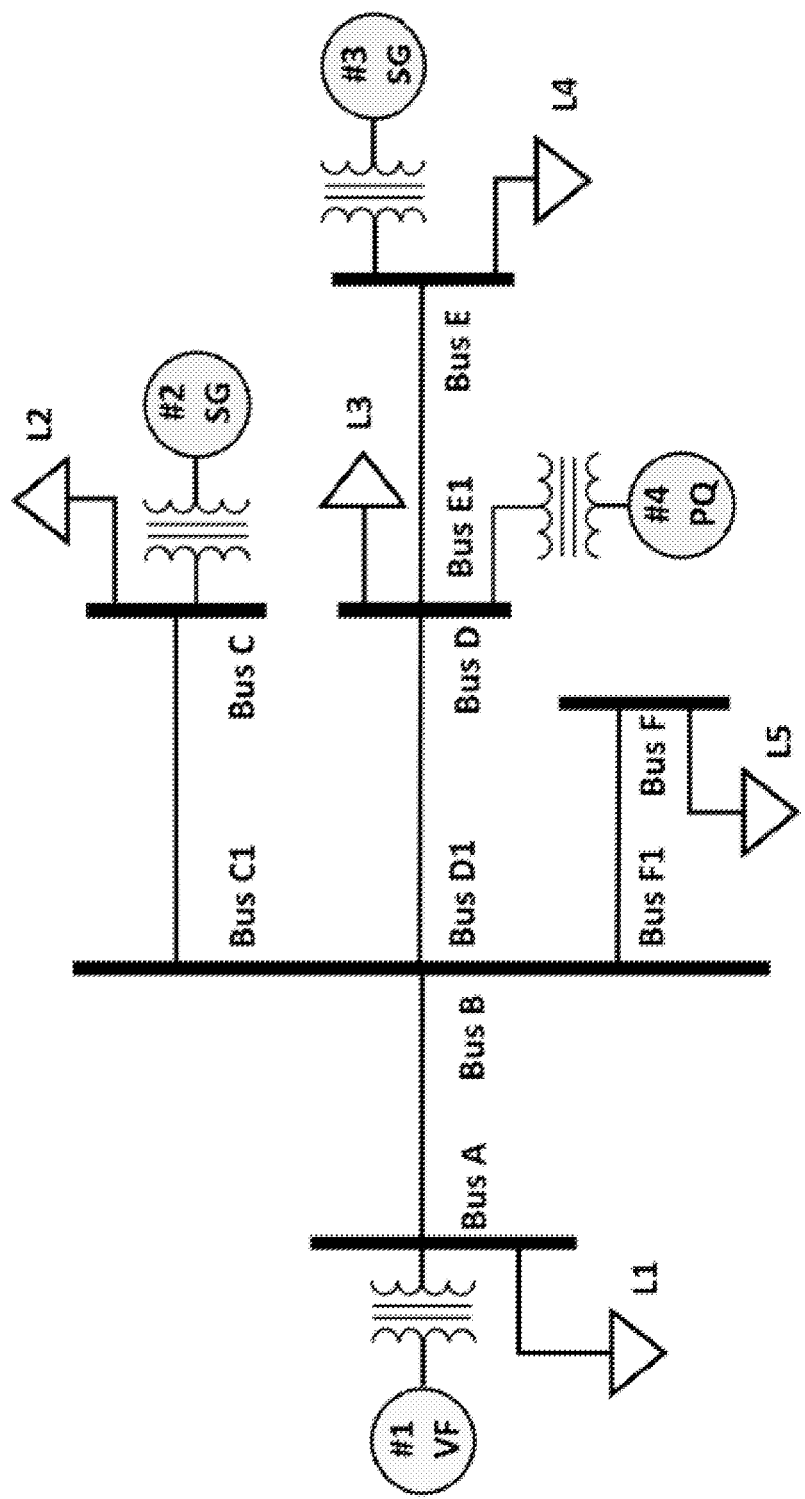
FIG. 7 is a schematic illustrating the simulated microgrid model, according to some embodiments of the present disclosure.
Figure 8A:
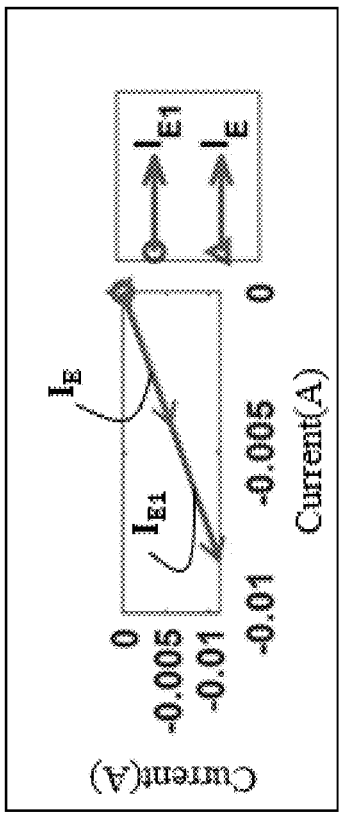
FIG. 8A shows phase diagram of zero-sequence terminal currents of branch AB, $I_A$ and $I_B$ when faults happens on branch AB.
Figure 8B:
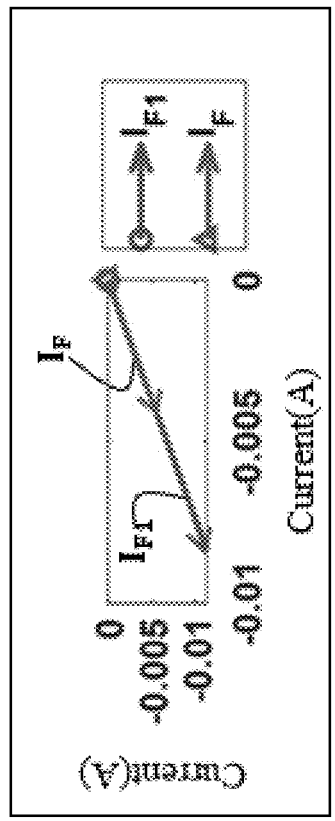
FIG. 8B shows phase diagram of zero-sequence terminal currents of branch C1C, $I_{C1}$ and $I_C$ when faults happens on branch AB.
Figure 8D:
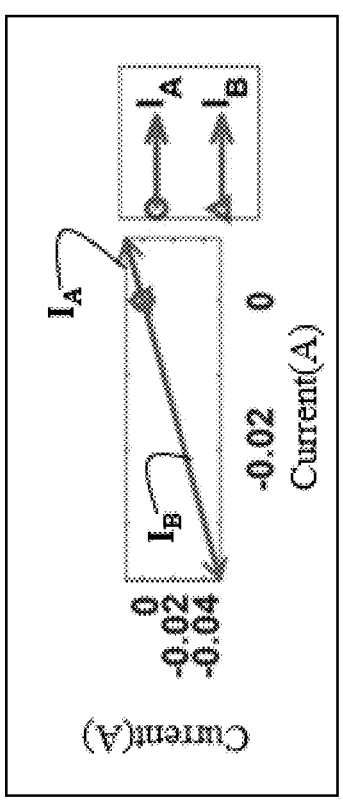
FIG. 8D shows phase diagram of zero-sequence terminal currents of branch E1E, $I_{E1}$ and $I_E$ when faults happens on branch AB.
Figure 8E:
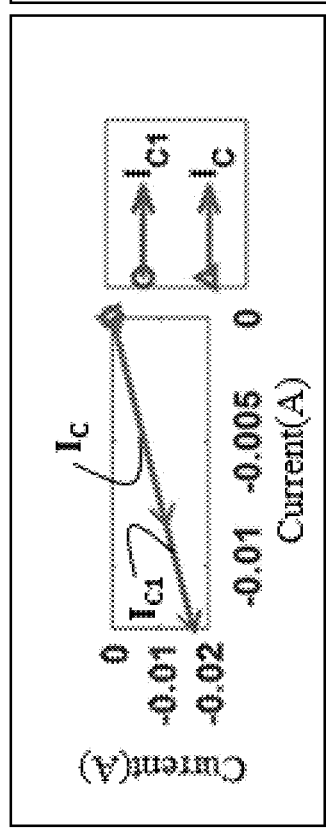
FIG. 8E shows phase diagram of zero-sequence terminal currents of branch F1F, $I_{F1}$ and $I_F$ when faults happens on branch AB.
Figure 8C:
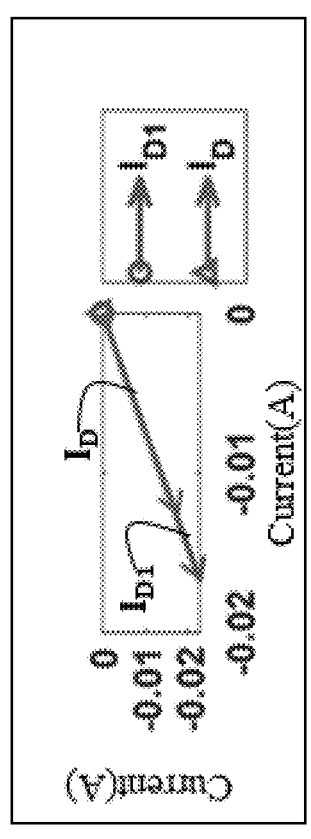
FIG. 8C shows phase diagram of zero-sequence terminal currents of branch D1D, $I_{D1}$ and $I_D$ when faults happens on branch AB.
Figure 8I:
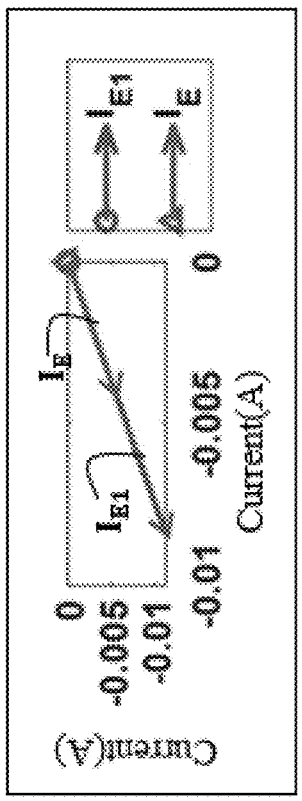
FIG. 8I shows phase diagram of zero-sequence terminal currents of branch E1E, $I_{E1}$ and $I_F$ when faults happens on branch C1C.
Figure 8J:
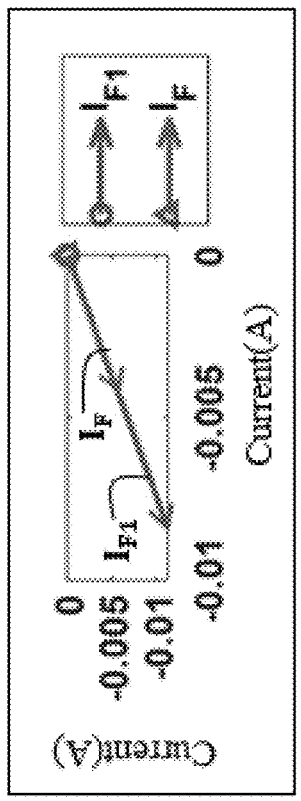
FIG. 8J shows phase diagram of zero-sequence terminal currents of branch F1F, $I_{F1}$ and $I_F$ when faults happens on branch C1C.
Figure 8F:
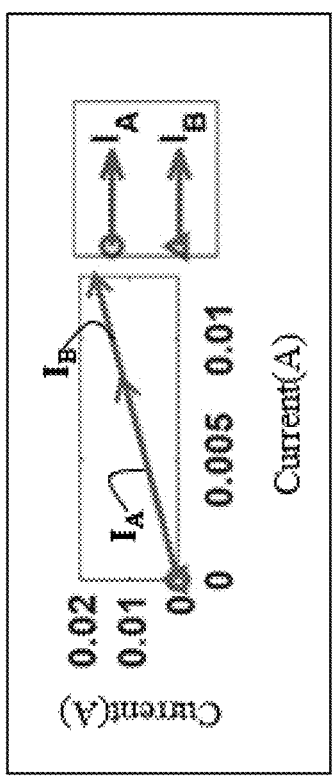
FIG. 8F shows phase diagram of zero-sequence terminal currents of branch AB, $I_A$ and $I_B$ when faults happens on branch C1C.
Figure 8G:
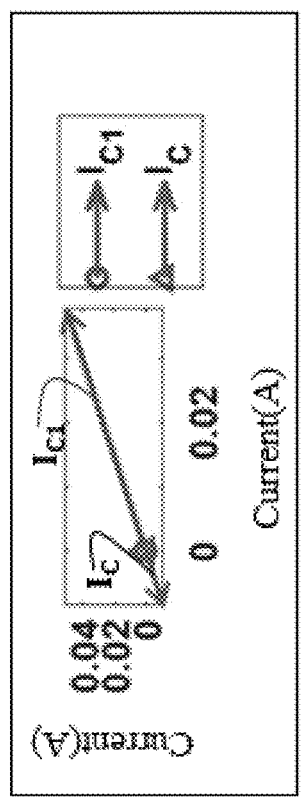
FIG. 8G shows phase diagram of zero-sequence terminal currents of branch C1C, $I_{C1}$ and $I_C$ when faults happens on branch C1C.
Figure 8H:
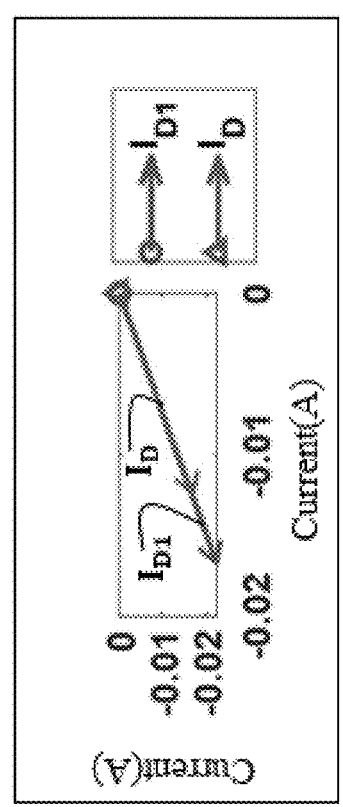
FIG. 8H shows phase diagram of zero-sequence terminal currents of branch D1D, $I_{D1}$ and $I_D$ when faults happens on branch C1C.
Figure 8N:
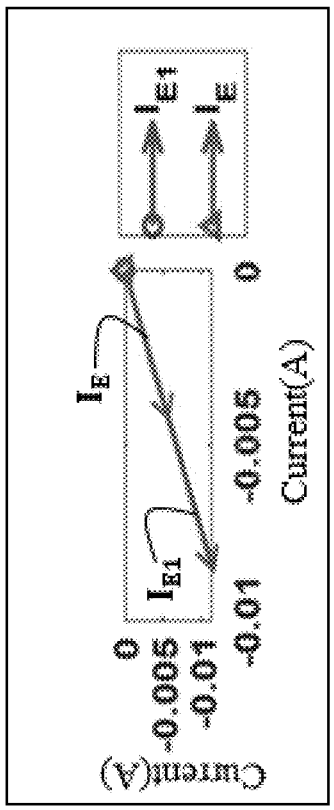
FIG. 8N shows phase diagram of zero-sequence terminal currents of branch E1E, $I_{E1}$ and $I_F$ when faults happens on branch D1D.
Figure 8O:
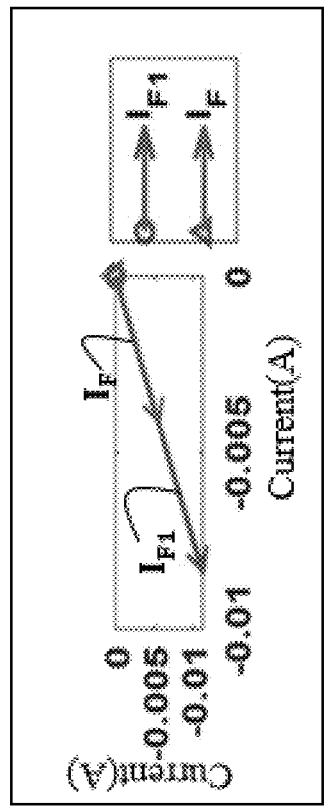
FIG. 8O shows phase diagram of zero-sequence terminal currents of branch F1F, $I_{F1}$ and $I_F$ when faults happens on branch D1D.
Figure 8K:
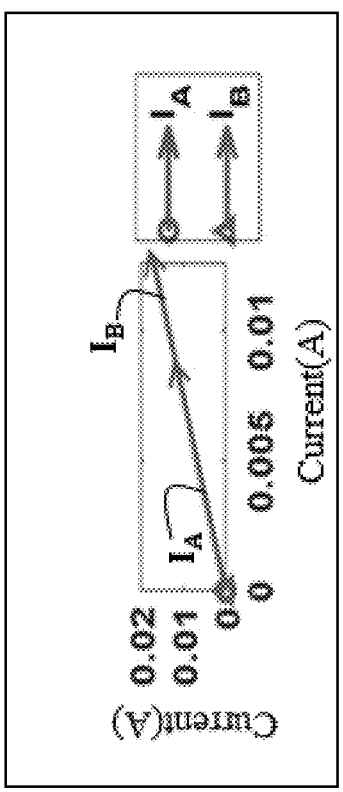
FIG. 8K shows phase diagram of zero-sequence terminal currents of branch AB, $I_A$ and $I_B$ when faults happens on branch D1D.
Figure 8L:
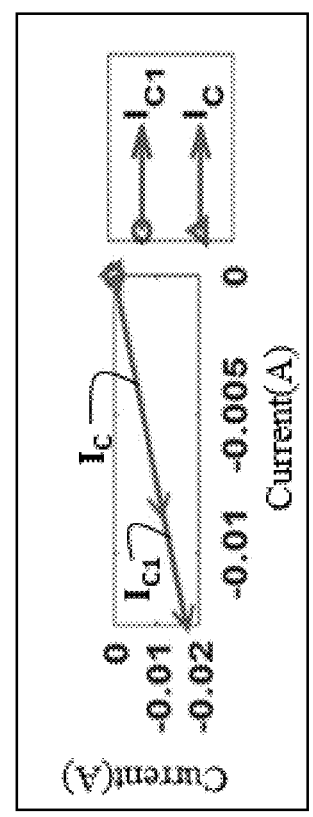
FIG. 8L shows phase diagram of zero-sequence terminal currents of branch C1C, $I_{C1}$ and $I_C$ when faults happens on branch D1D.
Figure 8M:
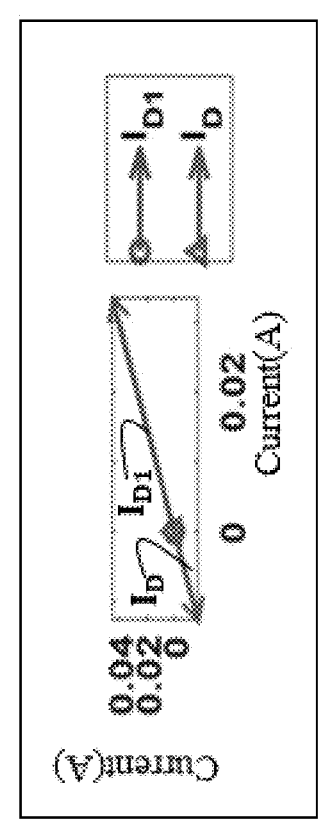
FIG. 8M shows phase diagram of zero-sequence terminal currents of branch D1D, $I_{D1}$ and $I_D$ when faults happens on branch D1D.
Figure 8P:
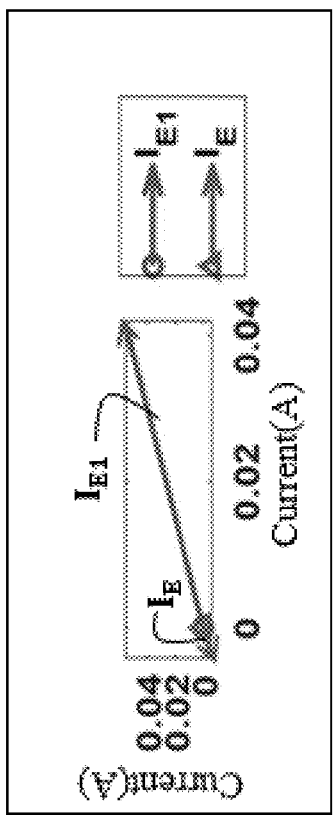
FIG. 8P shows phase diagram of zero-sequence terminal currents of branch AB, $I_A$ and $I_B$ when faults happens on branch E1E.
Figure 8Q:
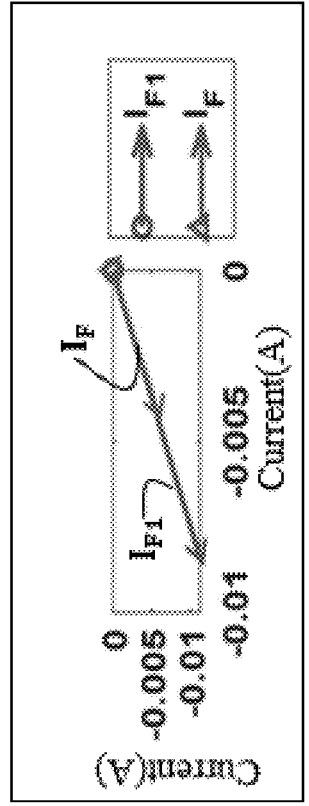
FIG. 8Q shows phase diagram of zero-sequence terminal currents of branch C1C, $I_{C1}$ and $I_C$ when faults happens on branch E1E.
Figure 8S:
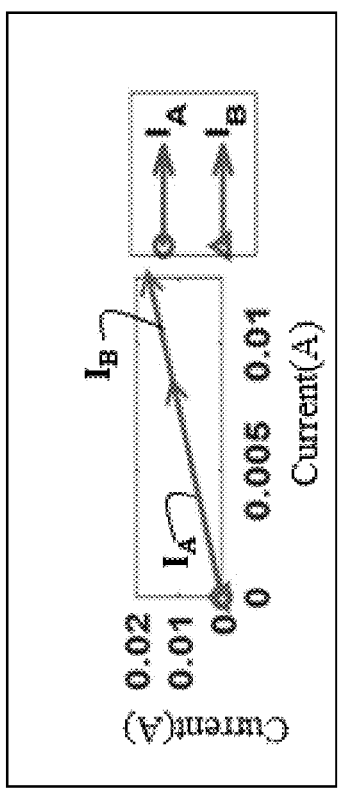
FIG. 8S shows phase diagram of zero-sequence terminal currents of branch E1E, $I_{E1}$ and $I_E$ when faults happens on branch E1E.
Figure 8T:
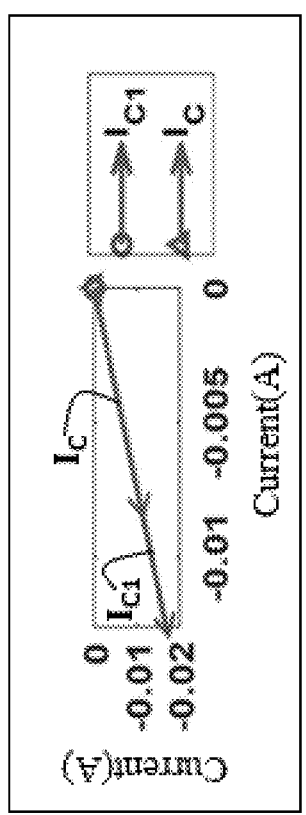
FIG. 8T shows phase diagram of zero-sequence terminal currents of branch F1F, $I_{F1}$ and $I_F$ when faults happens on branch E1E.
Figure 8R:
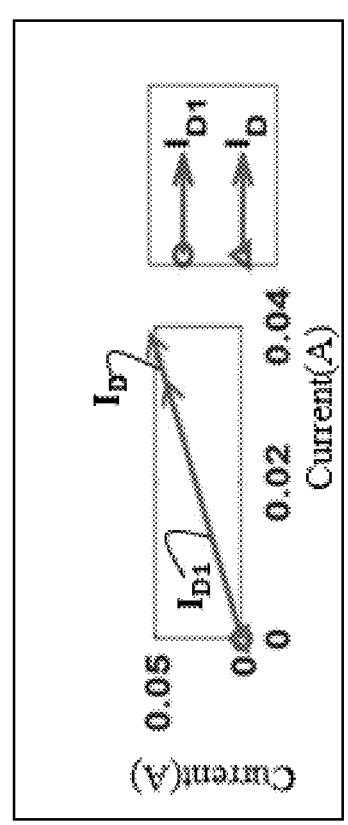
FIG. 8R shows phase diagram of zero-sequence terminal currents of branch D1D, $I_{D1}$ and $I_D$ when faults happens on branch E1E.

The islanded microgrid with multiple RESs and SGs in FIG. 7 is simulated using Simscape Electrical Library. Suppose DG #1 is under VF control, DGs #2 and #3 are traditional SGs, and DG #4 is under PQ control. It can be theoretically concluded from the zero-sequence fault model that the directions of the zero-sequence current are opposite only at the two ends of the faulted branch, which holds for even a limited fault-current level. In the simulation, suppose the system starts at t=0s and a single line-to-ground fault happens respectively on different branches at t=0.1s. The phase diagram of the zero-sequence current in each case is visualized in FIGS. 8A-8T, in which FIG. 8A shows phase diagram of zero-sequence terminal currents of branch AB, $I_A$ and $I_B$ when faults happens on branch AB; FIG. 8B shows phase diagram of zero-sequence terminal currents of branch C1C, $I_{C1}$ and $I_C$ when faults happens on branch AB; FIG. 8C shows phase diagram of zero-sequence terminal currents of branch D1D, $I_{D1}$ and $I_D$ when faults happens on branch AB; FIG. 8D shows phase diagram of zero-sequence terminal currents of branch E1E, $I_{E1}$ and $I_E$ when faults happens on branch AB; FIG. 8E shows phase diagram of zero-sequence terminal currents of branch F1f, $I_{F1}$ and $I_F$ when faults happens on branch AB; FIG. 8F shows phase diagram of zero-sequence terminal currents of branch AB, $I_A$ and $I_B$ when faults happens on branch C1C; FIG. 8G shows phase diagram of zero-sequence terminal currents of branch C1C, $I_{C1}$ and $I_C$ when faults happens on branch C1C; FIG. 8H shows phase diagram of zero-sequence terminal currents of branch D1D, $I_{D1}$ and $I_D$ when faults happens on branch C1C; FIG. 8I shows phase diagram of zero-sequence terminal currents of branch E1E, $I_{E1}$ and $I_E$ when faults happens on branch C1C; FIG. 8J shows phase diagram of zero-sequence terminal currents of branch F1F, $I_{F1}$ and $I_F$ when faults happens on branch C1C; FIG. 8K shows phase diagram of zero-sequence terminal currents of branch AB, $I_A$ and $I_B$ when faults happens on branch D1D; FIG. 8L shows phase diagram of zero-sequence terminal currents of branch C1C, $I_{C1}$ and $I_C$ when faults happens on branch D1D; FIG. 8M shows phase diagram of zero-sequence terminal currents of branch D1D, $I_{D1}$ and $I_D$ when faults happens on branch D1D; FIG. 8N shows phase diagram of zero-sequence terminal currents of branch E1E, $I_{E1}$ and $I_E$ when faults happens on branch D1D; FIG. 8O shows phase diagram of zero-sequence terminal currents of branch F1F, $I_{F1}$ and $I_F$ when faults happens on branch D1D; IG. 8P shows phase diagram of zero-sequence terminal currents of branch AB, $I_A$ and $I_B$ when faults happens on branch E1E; FIG. 8Q shows phase diagram of zero-sequence terminal currents of branch C1C, $I_{C1}$ and $I_C$ when faults happens on branch E1E; FIG. 8R shows phase diagram of zero-sequence terminal currents of branch D1D, $I_{D1}$ and $I_D$ when faults happens on branch E1E; FIG. 8S shows phase diagram of zero-sequence terminal currents of branch E1E, $I_{E1}$ and $I_E$ when faults happens on branch E1E; FIG. 8T shows phase diagram of zero-sequence terminal currents of branch F1F, $I_{F1}$ and $I_F$ when faults happens on branch E1E. In FIGS. 8A-8T, each arrow represents the zero-sequence current through a different terminal, which is measured at 60 ms after the fault happened (t=0.16s).

It can be observed that the directions of the zero-sequence current are opposite only at the two ends of the faulted branch. The dynamics of SG and IBDG do not show evident influence on the transient behavior of the faulted branch over the short time horizon at the beginning of the fault.

Figure 9:
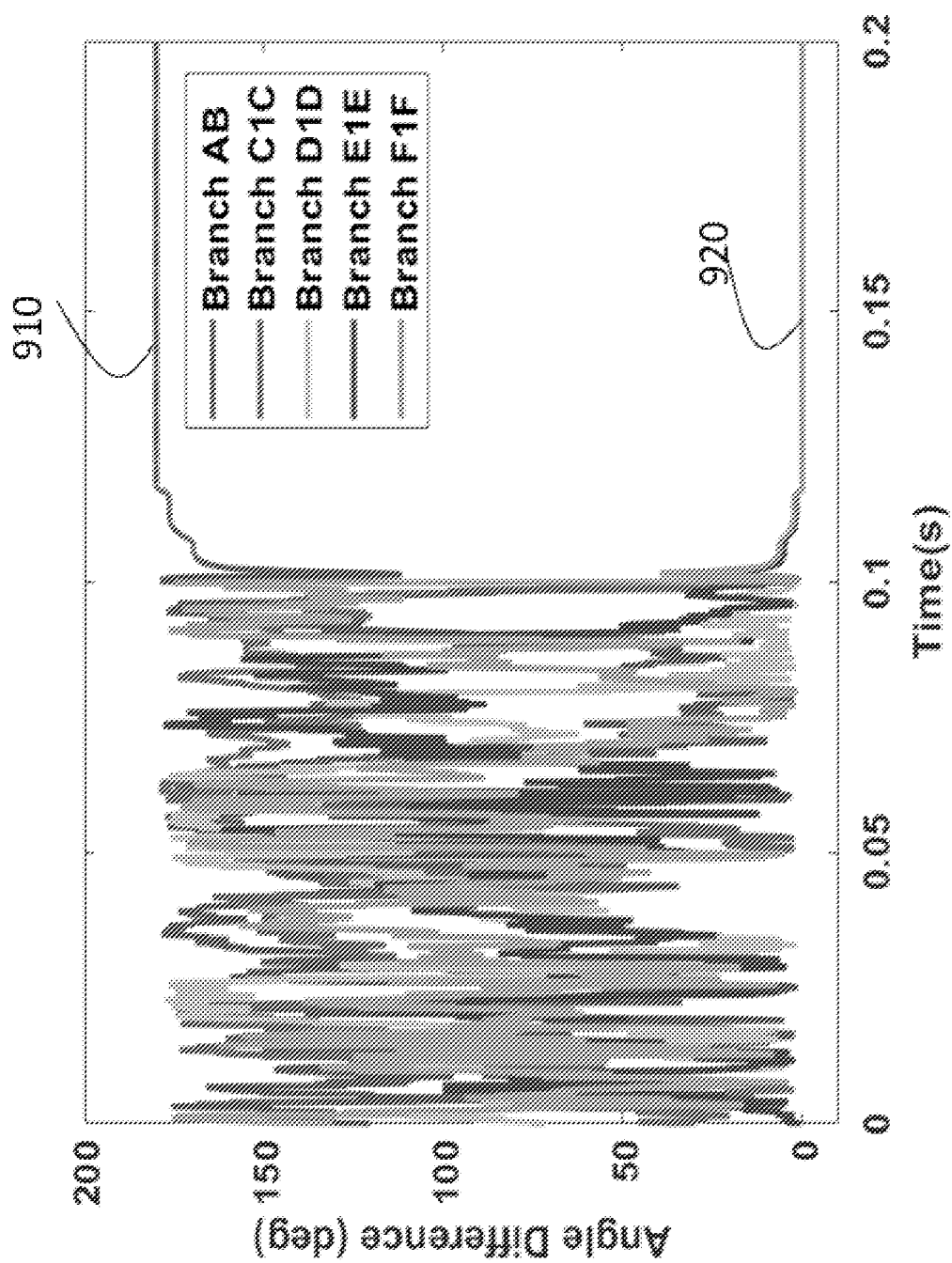
FIG. 9 is a schematic illustrating the monitoring angle differences of zero-sequence current, according to some embodiments of the present disclosure.

Therefore, a protection scheme can be designed as follows. First, monitor the phase angle difference of the zero-sequence current between the two ends of each branch. It performs chaotically when the microgrid is in normal operation. The reason for this is that the magnitude of the zero-sequence current is infinite small and the angle is unsteady and trivial in a balanced or close to balanced three-phase power system. Conversely, there exist detectable zero-sequence components and the angle becomes steady when a single line-to-ground fault happens. As visualized in FIG. 9, the angle difference is 180 (deg) only on the faulted branch 910, whereas it is 0 (deg) on other branches 920, which can locate the fault effectively.

Symmetrical Faults

The fault location technique based on zero-sequence components cannot be tailored to locate symmetric faults since zero-sequence components are trivial in balanced or close to balanced three-phase power systems. However, during the transient state immediately after a symmetrical fault happening (e.g. several microseconds after a fault happening), a negative-sequence fault current (both magnitude and phase angle) shows a significant difference at the two terminals of the faulted branch only. It is worthwhile to mention that the above statement does not contradict our basic knowledge that the negative-sequence component is neglectable in a symmetrical circuit system. Here we highlight that our observed period is the transient state right after a fault happening (about 10 ms), when the microgrid system is not strictly symmetrical. Take the model in FIG. 7 as an illustrative example. Suppose a three-phase short-circuit fault happens on different respective branches. The following Tables I-IV present the negative-sequence current through the two terminals of each branch with a fault that happened on different respective branches. The negative-sequence current is measured at 10 ms after the fault happens. The simulation results effectively validate the theoretical conclusion. Moreover, it is observed that the dynamics of SG and IBDG do not show evident influence on the transient behavior of the faulted branch over the short time horizon at the beginning of fault.

TABLE I

Current Measurement During A Fault Happening on Branch AB

| Branch | Current of Terminal 1 | | Current of Terminal 2 | |
|---|---|---|---|---|
| | Magnitude(A) | Angle(deg) | Magnitude(A) | Angle(deg) |
| AB | 19.66 | 144.66 | 426.37 | −179.39 |
| C1C | 224.14 | −179.38 | 224.14 | −179.38 |
| D1D | 203.74 | −179.39 | 203.74 | −179.39 |
| E1E | 210.74 | −179.36 | 210.74 | −179.36 |
| F1F | 1.51 | 0.77 | 1.51 | 0.78 |

TABLE II

Current Measurement During A Fault Happening on Branch C1C

| Branch | Current of Terminal 1 | | Current of Terminal 2 | |
|---|---|---|---|---|
| | Magnitude(A) | Angle(deg) | Magnitude(A) | Angle(deg) |
| AB | 20.83 | 145.62 | 20.83 | 145.62 |
| C1C | 218.89 | 4.19 | 259.14 | −179.17 |
| D1D | 237.34 | −178.97 | 237.34 | −178.97 |
| E1E | 243.50 | −179.18 | 243.50 | −179.18 |
| F1F | 1.81 | 0.86 | 1.81 | 0.93 |

TABLE III

Current Measurement During A Fault Happening on Branch D1D

| Branch | Current of Terminal 1 | | Current of Terminal 2 | |
|---|---|---|---|---|
| | Magnitude(A) | Angle(deg) | Magnitude(A) | Angle(deg) |
| AB | 20.83 | 145.62 | 20.83 | 145.62 |
| C1C | 259.14 | −179.17 | 259.14 | −179.17 |
| D1D | 240.61 | 3.69 | 237.34 | −178.97 |
| E1E | 243.50 | −179.18 | 243.50 | −179.18 |
| F1F | 1.81 | 0.86 | 1.81 | 0.93 |

TABLE IV

Current Measurement During A Fault Happening on Branch E1E

| Branch | Current of Terminal 1 | | Current of Terminal 2 | |
|---|---|---|---|---|
| | Magnitude(A) | Angle(deg) | Magnitude(A) | Angle(deg) |
| AB | 26.59 | 144.17 | 26.59 | 144.17 |
| C1C | 225.55 | −179.64 | 225.55 | −179.64 |
| D1D | 203.24 | 4.80 | 203.24 | 4.80 |
| E1E | 196.79 | 5.13 | 287.87 | −179.07 |
| F1F | 1.46 | −1.30 | 1.45 | −1.32 |

Figure 10:
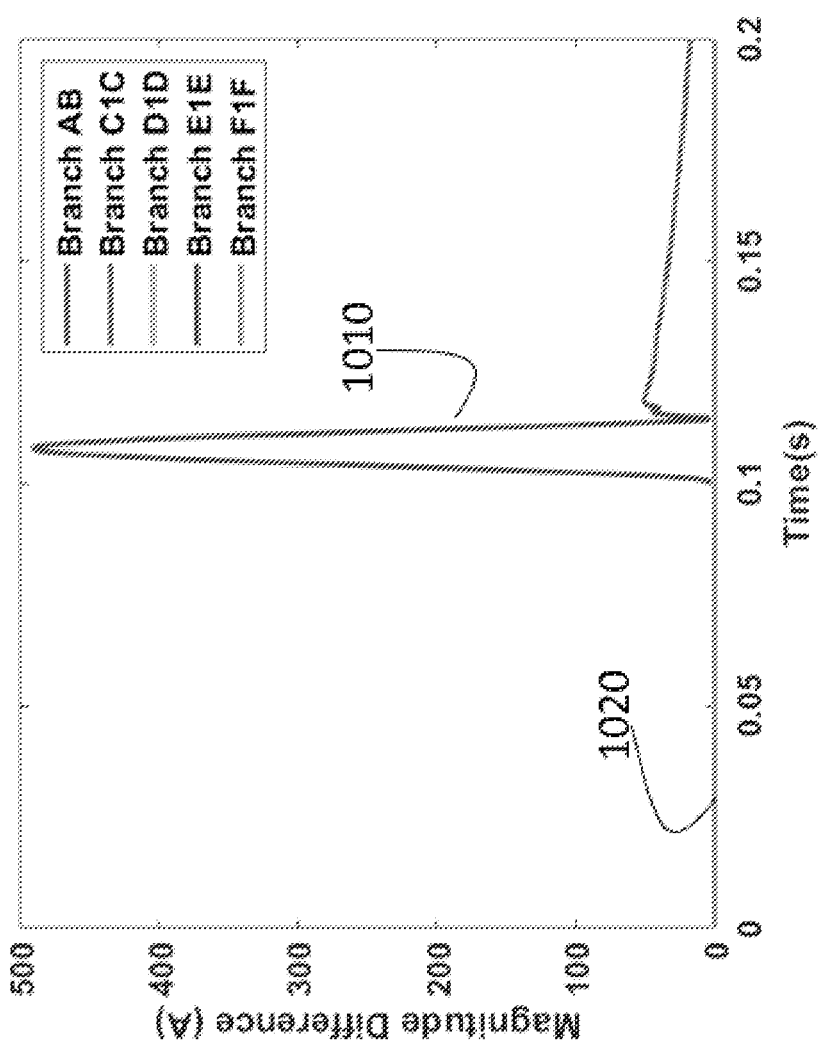
FIG. 10 is a schematic illustrating the magnitude differences of negative-sequence current, according to some embodiments of the present disclosure.

A protection scheme is proposed that relies on the measurement of magnitude differences of negative-sequence current between the two ends of each branch. The negative-sequence components are ignorable when the microgrid is under normal operation, whereas they are detectable when a fault happens. As shown in FIG. 10, the magnitude difference of the faulted branch 1010 is significantly larger than that of other branches 1020, which locates the fault efficiently.

A Special Conclusion for Three-Phase Grounded Faults

Figure 11:
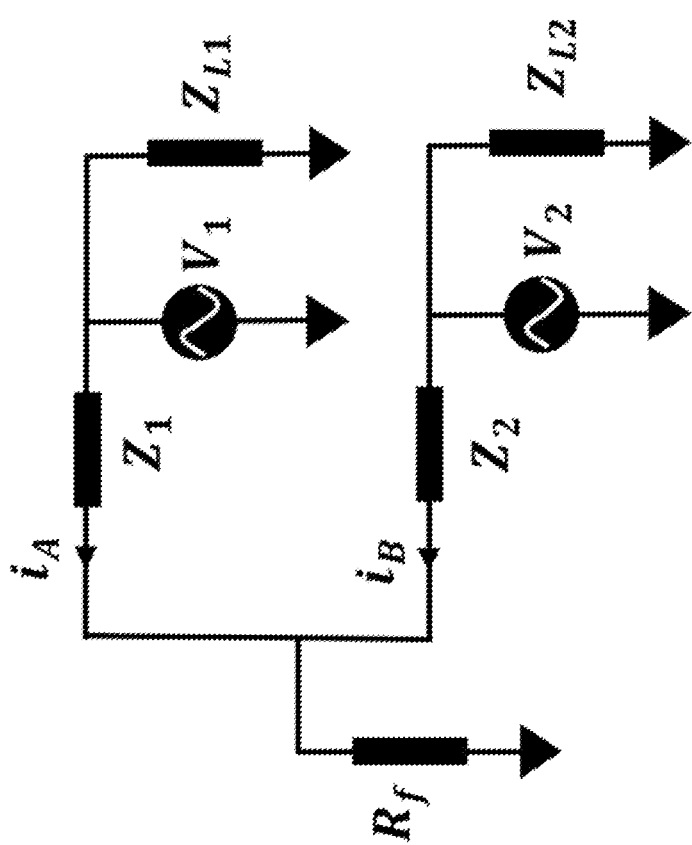
FIG. 11 is an equivalent circuit diagram of a microgrid with a three-phase grounded fault, according to some embodiments of the present disclosure.

We discuss another fault detection and location technique especially for three-phase grounded faults in this section. Taking one phase as an example, a microgrid with a three-phase grounded fault can be simplified as in the circuit diagram in FIG. 11. $R_f$ is the resistance of the grounded fault. Other notations are introduced in FIG. 11.

The output voltages of all DGs through transformers are usually required to be or be close to a unified value in a microgrid. Here we assume that the voltages of all DGs through transformers are regulated to be the same value, i.e., $V_1 = V_2 = V_m \cos(\omega t + \theta)$. Then the state equation of the circuit model is shown as:

$$\begin{pmatrix} i'_A \\ i'_B \end{pmatrix} = \begin{pmatrix} -(R_1 + R_f)/L_1 & -R_f/L_1 \\ -R_f/L_2 & -(R_2 + R_f)/L_2 \end{pmatrix} \begin{pmatrix} i_A \\ i_B \end{pmatrix} + V_m \cos(\omega t + \theta) \quad (5)$$

$R_1, L_1, R_2, L_2$ are resistance and inductance of the equivalent line impedances. The solutions are shown as follows. Suppose $$i_A = i_A^{(1)} + i_A^{(2)}, i_B = i_B^{(1)} + i_B^{(2)} \quad (6)$$

where $i_A^{(1)}$ and $i_B^{(1)}$ are special solutions, i.e. zero state response (ZSR), and $i_A^{(2)}$ and $i_B^{(2)}$ are complementary solutions, i.e. zero input response (ZIR). ZSR is the response of the circuit with initial state of zero, and results only from the external inputs or driving functions of the circuit and not from the initial state. ZIR, also called the natural response, results only from the initial state of the circuit and not from any external drive.

$$i_A^{(1)} = (2(\lambda_2 - \alpha)\mu_1 - (\lambda_1 + \lambda_2 + 2\alpha)\mu_2)/(\lambda_2 - \lambda_1) \quad (7)$$

$$i_B^{(1)} = (-2(\lambda_1 - \alpha)\mu_1 + (\lambda_1 + \lambda_2 - 2\alpha)\mu_2)/(\lambda_2 - \lambda_1) \quad (8)$$

$$i_A^{(2)} = e^{-\lambda_2 t}, i_B^{(2)} = -e^{-\lambda_2 t} \quad (9)$$

where $$a = -(R_1 + R_f)/L_1, b = -R_f/L_1 \quad (10)$$

$$\lambda_{1,2} = (-(R_1 + R_f)/L_1 - (R_2 + R_f)/L_2 \pm \sqrt{\Delta})/2 \quad (11)$$

$$\Delta = \left(\frac{R_1 + R_f}{L_1}\right)^2 + \left(\frac{R_2 + R_f}{L_2}\right)^2 + \frac{2R_f^2 - 2R_1R_2 - 2R_f(R_1 + R_2)}{L_1 L_2} \quad (12)$$

$$\mu_1 = V_m/z_1 \cdot \sin(\omega t + \theta + \varphi_1) - e^{-\lambda_1 t} \sin(\theta + \varphi_1) \quad (13)$$

$$\mu_2 = V_m/z_2 \cdot \sin(\omega t + \theta + \varphi_2) - e^{-\lambda_2 t} \sin(\theta + \varphi_2) \quad (14)$$

$$z_1 = (\omega^2 + \lambda_1^2)^{1/2}, z_2 = (\omega^2 + \lambda_2^2)^{1/2} \quad (15)$$

$$\varphi_1 = \tan^{-1}(\lambda_1/\omega), \varphi_2 = \tan^{-1}(\lambda_2/\omega) \quad (16)$$

It is not rigorous to define and leverage the concept of the phase angle of phase currents $i_A$ and $i_B$ due to the existence of harmonics. Instead, we use the sign of $i_A$ and $i_B$ to describe their characteristics. Assume that the reference direction for current $i_A$ and $i_B$ is as marked in FIG. 11. Then the signs of $i_A$ and $i_B$ are always opposite when there is no fault happening. Moreover, it can be known from the above derivations that the signs of $i_A$ and $i_B$ are not always opposite when the following assumptions hold: (a) the attenuation terms are not dominant in $i_A$ and $i_B$; (b) $\phi_1 \approx \pi/4$ or $\phi_2 \approx 0$ or $\phi_2 \approx \pi$ or $(\lambda_2 - a)(-1/a - 2a/b) = (a - \lambda_1)(1/a - 2a/b)$. The ratio R/X of a microgrid usually ranges 0.1-10. As for a small fault resistance, assumption (a) and $\phi_2 \approx 0$ in assumption (b) hold. Therefore, it is concluded that $i_A$ and $i_B$ are not always opposite when a three-phase grounded fault happens.

Figure 12:
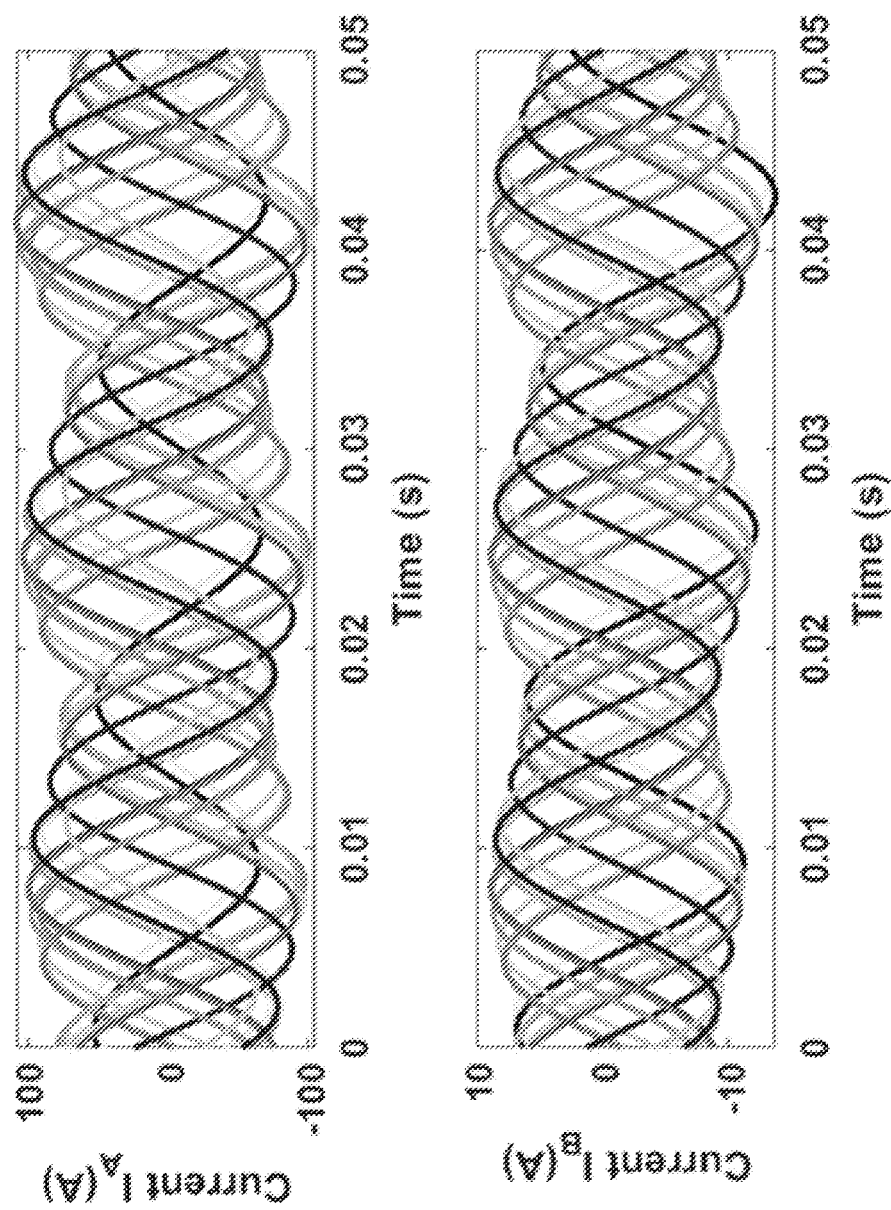
FIG. 12 is a schematic illustrating the comparison between $i_A$ and $i_B$ under multiple scenarios, according to some embodiments of the present disclosure.
Figure 13:
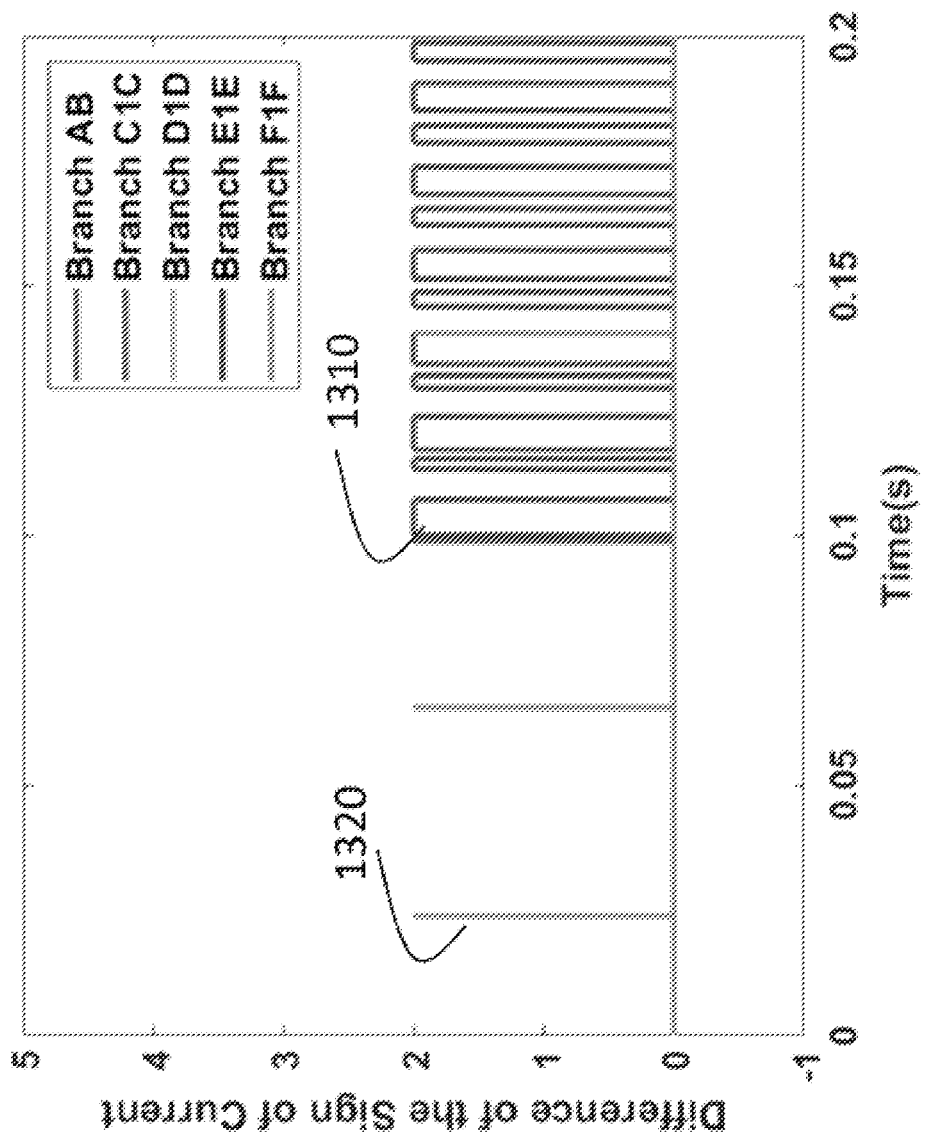
FIG. 13 is a schematic illustrating the monitoring magnitude differences of current, according to some embodiments of the present disclosure.

This conclusion is validated by simulation tests using Mathworks Simulink. First, we test multiple scenarios with different line impedances and initial phase angles using the simplified circuit in FIG. 11. The simulation results are shown in FIG. 12. The curves in top and bottom sections plotted by the same color represent $i_A$ and $i_B$ in the same scenario. It is observed that the signs of $i_A$ and $i_B$ are not opposite. In practice, a three-phase grounded fault can be identified by monitoring the real-time phase current. We quantify the signs of the phase current and calculate the difference in it between the two ends of each branch, which is notated by $DS_c$.

$$DS_c(t) = \left| \frac{I_M(t)}{|I_M(t)|} - \frac{I_N(t)}{|I_N(t)|} \right| \qquad (17)$$

where $I_M$ and $I_N$ are the currents through the two ends of branch MN. Take the model in FIG. 7 as an illustrative example. The $DS_c$ of each branch is plotted in FIG. 13. It is observed that $DS_c$ is transitioning between 0 and 2 for the faulted branch 1310 and always equals 0 for the other branches 1320 (it equals 2 very occasionally due to noise). This phenomenon can validate our derivation. Then it can be concluded that this technique can effectively locate three-phase grounded faults that happen in microgrids.

Implementation of Microgrid Fault Location and Protection

Figure 14:
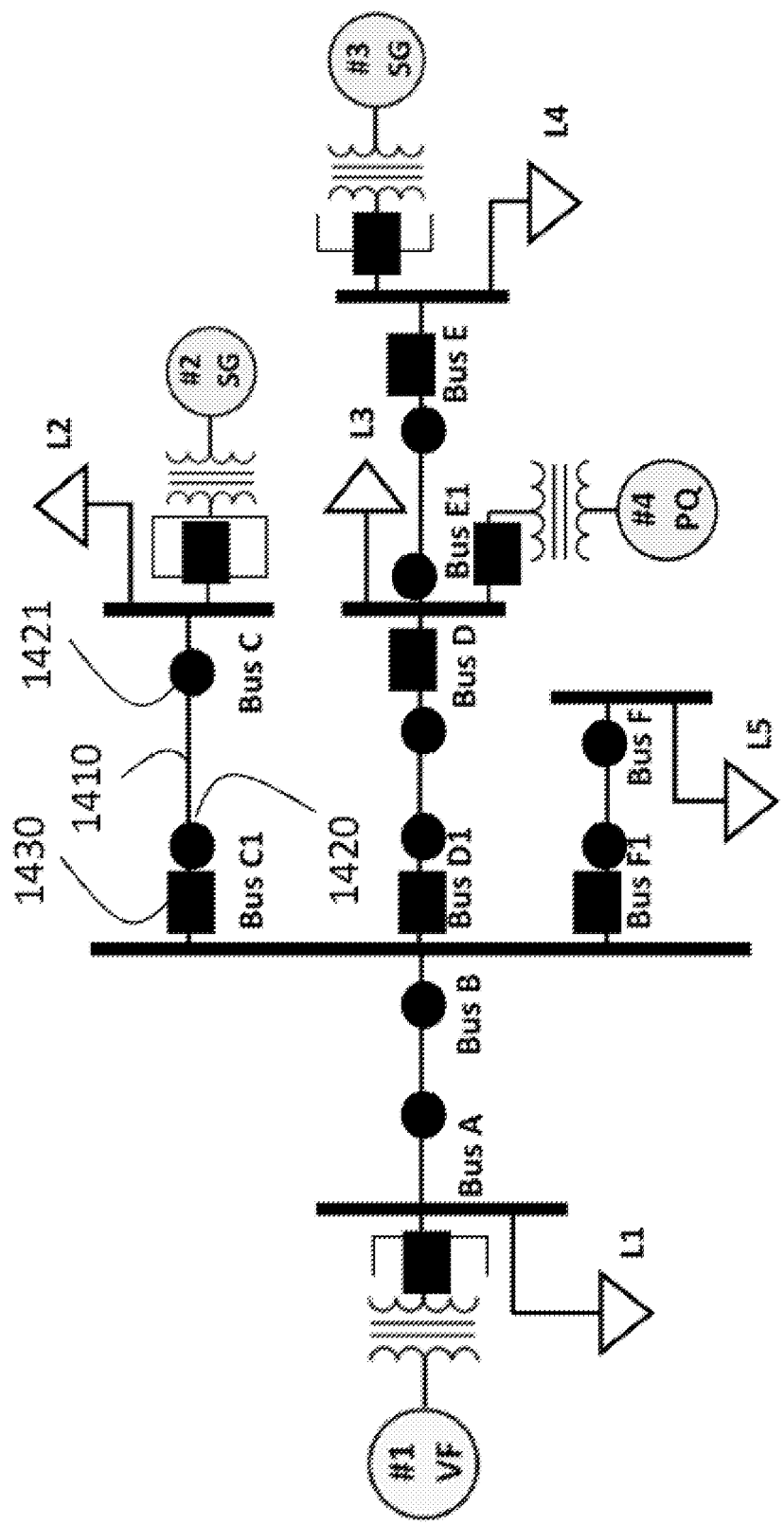
FIG. 14 is a schematic illustrating the implementation of fault location and protection of inverter dominated islanded microgrid.

FIG. 14 is a schematic illustrating the implementation of proposed fault location and protection of inverter dominated islanded microgrid. In the figure, each line segment 1410 may include two sensors including a first terminal sensor 1420 and a second terminal sensor 1421, one or two switchable devices 1430 that used for connecting and disconnecting the power supply to the branch from the distributed generators.

The fault location task can be implemented in a central manner or a distributed manner. For a centralized implementation, a central processor is implemented for the entire microgrid. It collects measurements from all line segments within the microgrid, and bases on all those measurements to determine the faulted line segment.

For a distributed implementation, each bus has a processor to locate possible fault among its connected line segments. It only collects measurements from line segments that it connects to, and also only identify fault on those connected line segments.

The set of first-tier switches that are closest to the fault line segments are served as main protection scheme to disconnect the fault line from the power supply of all distributed generators, if distance is measured by number of switches between two destinations.

Similarly, when the distance is measured by number of switches between two destinations, the set of second-tier switches that are second closest to the fault line segments are served as backup protection scheme to disconnect the fault line from the power supply of all distributed generators if the main protection scheme fails.

For example, the first-tier switches for isolating faults on line C1C includes switch at bus C1 on line C1C, and switch connected to DG #2, and the second-tier switches include includes switch connected to #1 SG, switch at bus D1 along line D1D, and switch at bus F1 along line F1F.

For isolating faults on line D1D, the first tier includes switches at bus D1 and bus D along line D1D, and second tier includes switch connected to #1 SG, switch connected to DG #4, switch at bus C1 along line C1C, switch at bus E along line E1E, switch at bus F1 along line F1F.

The individual embodiments above may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A computer-implemented method for protecting a power grid system including a primary bus and an islanded microgrid disconnected from a distribution system, the islanded microgrid forming branches from the primary bus, the islanded microgrid including at least one distributed generator (DG), each DG including at least one switchable device to separate power supply of the DG from the power grid, each of the branches including a first terminal sensor arranged at a near side of the primary bus and a second terminal sensor arranged at opposite terminal bus of the branch, the first terminal and second terminal sensors indicating a branch location of each of the branches in the power grid, wherein the method uses a processor coupled with a memory stored instructions implementing the method, wherein the instructions, when executed by the processor carry out at steps of the method, comprising:

receiving, from each of the branches, measurement data including the branch location from the first terminal sensor and the second terminal sensor, wherein the measurement data include zero-sequence currents of the first terminal sensor and the second terminal sensor, negative-sequence currents of the first terminal sensor and the second terminal sensor, and phase currents of the first terminal sensor and the second terminal sensor;

determining a branch indicating a fault status among the branches if there is approximately a 180-degree phase angle difference between the zero-sequence currents, if a difference amount between the negative-sequence currents of the first and second terminal sensors at the branch is equal to or greater than a threshold, or if a difference of signs of any phase currents as a function of time indicates transitions between zero and two; and transmitting a control command to the at least one switchable device that is configured to isolate the determined branch indicating the fault status from the at least one DG, wherein the at least one switchable device is determined based on a distance from the at least one switchable device to the determined branch, wherein the control command instructs the switchable device to disconnect the determined branch from the at least one DG.

2. The method of claim 1, wherein the primary bus is a point of common coupling between the islanded microgrid and the distribution system, and distributed generators are connected to the islanded microgrid through ungrounded transformers.

3. The method of claim 1, wherein each of the islanded microgrids includes at least one inverter-based distributed generator (IBDG).

4. The method of claim 3, wherein each of IBDGs is equipped with a fault current limiter (FCL).

5. The method of claim 4, wherein one of IBDGs is operated under voltage frequency (VF) control mode, and remaining IBDGs are operated under active and reactive power (PQ) control mode.

6. The method of claim 1, the difference amount between the negative-sequence currents of the first terminal and second terminal sensors at the branch can be computed using magnitudes or phase angles of negative-sequence currents.

7. The method of claim 1, the threshold for the difference amount between the negative-sequence currents can be set as a multiple of maximum difference amount under pre-fault condition, such as 2.5.

8. The method of claim 1, wherein the function of sign difference of phase currents on a branch between bus M and bus N, $DS_c(t)$ is defined as:

$$DS_c(t) = \left| \frac{I_M(t)}{|I_M(t)|} - \frac{I_N(t)}{|I_N(t)|} \right|$$

where $I_M$ and $I_N$ are the currents through the two ends of branch MN.

9. The method of claim 1, wherein the determining of the branch indicting the fault status can be centrally implemented by using one central processor for the entire microgrid to locate the faulted branch upon receiving current measurements from all branches.

10. The method of claim 1, wherein the determining of the branch indicting the fault status can be distributed implemented by using one distributed processor for each monitored bus to locate the faulted branch from branches connected to the bus upon receiving current measurements from the connected branches to the bus.

11. The method of claim 1, wherein the switches to isolate the branch indicting the fault status is determined as the set of switches located closest to the fault branch along the paths to each of distributed generators by measuring distance as the number of switches between two destinations along the path.

12. A fault location and protection system for protecting a power grid system including a primary bus and an islanded microgrid disconnected from a distribution system, the islanded microgrid forming branches from the primary bus, the islanded microgrid including at least one distributed generator (DG), each the at least one DG including at least one switchable device to separate power supply of the at least one DG from the power grid, each of the branches including a first terminal sensor arranged at a near side of the primary bus and a second terminal sensor arranged at opposite terminal bus of the branch, the first and second sensors indicating a branch location of each of the branches in the power grid, wherein the method uses a processor coupled with a memory stored instructions implementing the method, wherein the instructions, when executed by the processor carry out at steps of the method, comprising:

an interface configured to receive, from each of the branches, measurement data including the branch location from the first terminal sensor and the second terminal sensor, wherein the measurement data include zero-sequence currents of the first terminal sensor and the second terminal sensor, negative-sequence currents of the first terminal sensor and the second terminal sensor, and phase currents of the first terminal sensor and the second terminal sensor;

a processor configured to perform a computer-implemented method;

a memory configured to store the computer-implemented method, wherein the method uses the processor coupled with the memory stored instructions implementing the method, wherein the instructions, when executed by the processor carry out at steps of the method, comprises:

determining a branch indicating a fault status among the branches if there is approximately a 180-degree phase angle difference between the zero-sequence currents, if a difference amount between the negative-sequence currents of the first and second terminal sensors at the branch is equal to or greater than a threshold, or if a difference of signs of any phase currents as a function of time indicates transitions between zero and two; and transmitting a control command to the at least one switchable device that is configured to isolate the determined branch indicating the fault status from the at least one DG, wherein the at least one switchable device is determined based on a distance from the at least one switchable device to the determined branch, wherein the control command instructs the switchable device to disconnect the determined branch from the at least one DG.

13. The system of claim 12, wherein the primary bus is a point of common coupling between the islanded microgrid and the distribution system, and distributed generators are connected to the islanded microgrid through ungrounded transformers.

14. The system of claim 12, wherein each of the islanded microgrids includes at least one inverter-based distributed generator (IBDG).

15. The system of claim 14, wherein each of IBDGs is equipped with a fault current limiter (FCL).

16. The system of claim 15, wherein one of IBDGs is operated under voltage frequency (VF) control mode, and remaining IBDGs are operated under active and reactive power (PQ) control mode.

17. The system of claim 12, the difference amount between the negative-sequence currents of the first terminal and second terminal sensors at the branch can be computed using magnitudes or phase angles of negative-sequence currents.

18. The system of claim 12, the threshold for the difference amount between the negative-sequence currents can be set as a multiple of maximum difference amount under pre-fault condition, such as 2.5.

19. The system of claim 12, wherein the function of sign difference of phase currents on a branch between bus M and bus N, $DS_c(t)$ is defined as:

$$DS_c(t) = \left| \frac{I_M(t)}{|I_M(t)|} - \frac{I_N(t)}{|I_N(t)|} \right| w$$

where $I_M$ and $I_N$ are the currents through the two ends of branch MN.

20. The system of claim 12, wherein the determining of the branch indicting the fault status can be centrally implemented by using one central processor for the entire microgrid to locate the faulted branch upon receiving current measurements from all branches.

21. The system of claim 12, wherein the determining of the branch indicting the fault status can be distributed implemented by using one distributed processor for each monitored bus to locate the faulted branch from branches connected to the bus upon receiving current measurements from the connected branches to the bus.

22. The system of claim 12, wherein the switches to isolate the branch indicting the fault status is determined as the set of switches located closest to the fault branch along the paths to each of distributed generators by measuring distance as the number of switches between two destinations along the path.

* * * * *